US009137158B2

United States Patent
Ueta et al.

(10) Patent No.: US 9,137,158 B2
(45) Date of Patent: Sep. 15, 2015

(54) COMMUNICATION APPARATUS AND COMMUNICATION METHOD

(71) Applicant: Hitachi, Ltd., Tokyo (JP)

(72) Inventors: Taisuke Ueta, Yokohama (JP); Hayato Hoshihara, Yokohama (JP); Masayuki Takase, Yokohama (JP); Akihiko Tsuchiya, Fujisawa (JP); Yusuke Yajima, Fujisawa (JP)

(73) Assignee: HITACHI, LTD., Tokyo (JP)

( * ) Notice: Subject to any disclaimer, the term of this patent is extended or adjusted under 35 U.S.C. 154(b) by 94 days.

(21) Appl. No.: 13/905,791

(22) Filed: May 30, 2013

(65) Prior Publication Data

US 2013/0322450 A1 Dec. 5, 2013

(30) Foreign Application Priority Data

May 31, 2012 (JP) .................................. 2012-124938

(51) Int. Cl.
*H04L 12/28* (2006.01)
*H04L 12/56* (2006.01)
*H04L 12/741* (2013.01)
*H04L 12/931* (2013.01)
*H04L 12/933* (2013.01)

(52) U.S. Cl.
CPC .............. *H04L 45/74* (2013.01); *H04L 49/00* (2013.01); *H04L 49/1523* (2013.01)

(58) Field of Classification Search
CPC ......... H04L 29/06; H04L 45/00; H04L 12/15; H04L 45/74; H04L 29/0653; H04L 49/3009; H04L 47/10
USPC ........................................................ 370/392
See application file for complete search history.

(56) References Cited

U.S. PATENT DOCUMENTS

| | | | |
|---|---|---|---|
| 5,337,410 A * | 8/1994 | Appel ............................ 345/501 |
| 6,058,267 A * | 5/2000 | Kanai et al. ..................... 712/28 |
| 6,173,386 B1 * | 1/2001 | Key et al. ......................... 712/10 |
| 6,721,309 B1 | 4/2004 | Stone et al. |
| 8,594,131 B1 * | 11/2013 | Gmuender et al. ........... 370/475 |
| 8,762,581 B2 * | 6/2014 | Modelski et al. ............. 709/250 |
| 2004/0062259 A1 * | 4/2004 | Jeffries et al. ................. 370/412 |
| 2006/0268719 A1 * | 11/2006 | Takase et al. ............... 370/235.1 |
| 2009/0116398 A1 * | 5/2009 | Shi et al. ....................... 370/252 |
| 2009/0225757 A1 * | 9/2009 | Imao ............................ 370/392 |

(Continued)

FOREIGN PATENT DOCUMENTS

JP 2000-358066 A 12/2000

*Primary Examiner* — Mark Rinehart
*Assistant Examiner* — Sanjay K Dewan
(74) *Attorney, Agent, or Firm* — Volpe and Koenig, P.C.

(57) ABSTRACT

In an exemplary communication apparatus, an assignment module determines whether processing for a second packet assigned the flow ID associated with a received first packet is being executed. The assignment module determines a parallel processing module to execute processing for the first packet and a parameter to be included in a notice of assignment. The determined parallel processing module acquires a result of execution of the processing for the second packet from the computation table or the result of execution of the processing held in the parallel processing module according to the received notice of assignment. The determined parallel processing module executes the processing for the first packet using the result of execution of the processing for the second packet and the information included in the notice of assignment, and updates a computation table with a result of execution of the processing for the first packet.

14 Claims, 23 Drawing Sheets

(56) References Cited

U.S. PATENT DOCUMENTS

2010/0293353 A1* 11/2010 Sonnier et al. ............... 711/170
2011/0292981 A1* 12/2011 Kihara et al. ................. 375/224
2014/0056307 A1* 2/2014 Hutchison et al. ............ 370/394
2014/0068622 A1* 3/2014 Gmuender et al. ........... 718/102

* cited by examiner

| PARALLEL PROCESSING MODULE (601) | FLOW ID (602) | PROCESSING STATUS COUNTER (603) |
|---|---|---|
| #1 | ID#100 | 5 |
| #2 | ID#200 | 3 |
| ⋮ | ⋮ | ⋮ |
| #N | NOT IN USE | 0 |

USED FLOW MANAGEMENT LIST

*FIG. 6*

| FLOW ID (701) | SETTING INFORMATION (702) |
|---|---|
| ID#1 | SETTING #1 |
| ID#2 | SETTING #2 |
| ⋮ | ⋮ |

SETTING TABLE

*FIG. 7*

| FLOW ID (801) | COMPUTATION RESULT (802) |
|---|---|
| ID#1 | RESULT #1 |
| ID#2 | RESULT #2 |
| ⋮ | ⋮ |

COMPUTATION TABLE

*FIG. 8*

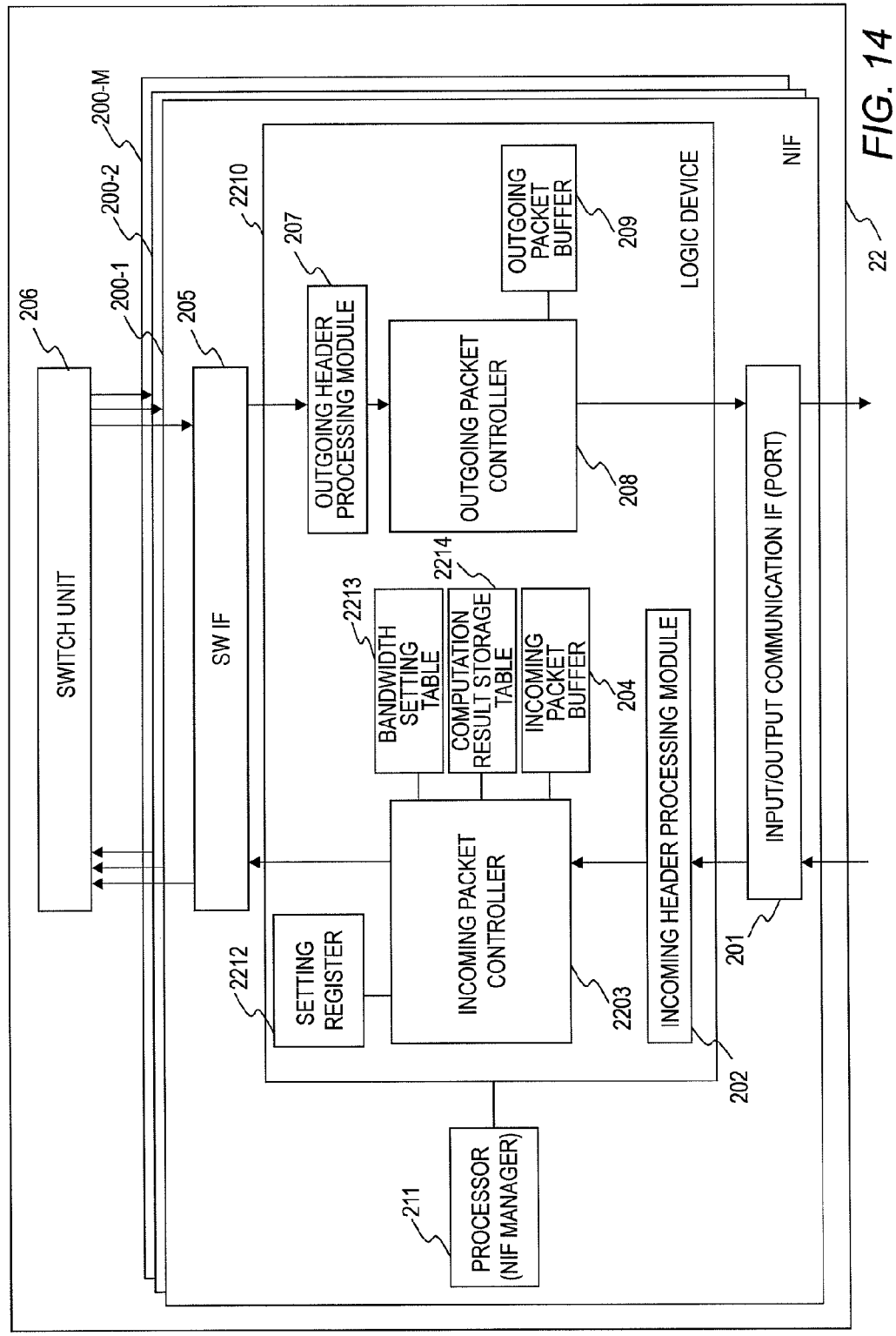

| FLOW ID | PERIODICALLY ADDED TOKEN VALUE | DEPTH OF TOKEN BUCKET |
|---|---|---|
| ID#1 | 10 | 1000 |
| ID#2 | 20 | 1000 |
| ⋮ | ⋮ | ⋮ |

BANDWIDTH SETTING TABLE

*FIG. 16*

| FLOW ID | PREVIOUS PACKET ARRIVAL TIME | STORED TOKEN VALUE |
|---|---|---|
| ID#1 | 2000 | 100 |
| ID#2 | 700 | 300 |
| ⋮ | ⋮ | ⋮ |

COMPUTATION RESULT STORAGE TABLE

*FIG 17*

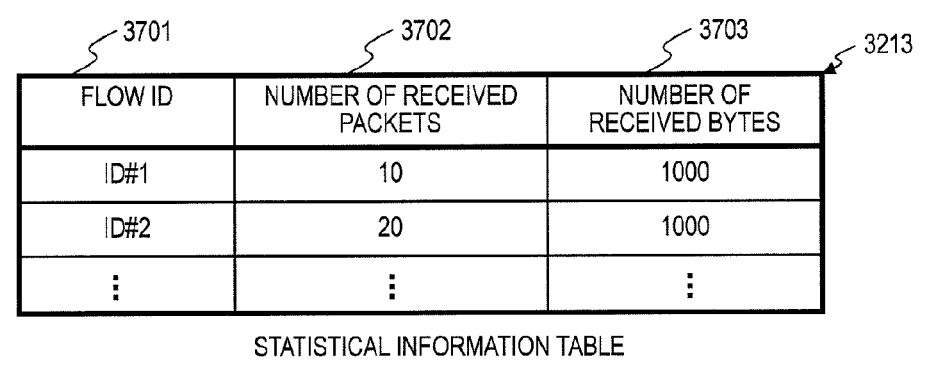

| FLOW ID ⌐3701 | NUMBER OF RECEIVED PACKETS ⌐3702 | NUMBER OF RECEIVED BYTES ⌐3703 | ⌐3213 |
|---|---|---|---|
| ID#1 | 10 | 1000 | |
| ID#2 | 20 | 1000 | |
| ⋮ | ⋮ | ⋮ | |

STATISTICAL INFORMATION TABLE

*FIG. 23*

COMMUNICATION APPARATUS AND COMMUNICATION METHOD

CLAIM OF PRIORITY

The present application claims priority from Japanese patent application JP2012-124938 filed on May 31, 2012, the content of which is hereby incorporated by reference into this application.

BACKGROUND

This invention relates to a communication apparatus and, in particular, relates to a communication apparatus for processing packets.

The traffic volume in network systems is swelling because of prevalence of digitalization of television contents or web video distribution services in recent years. As a result, the demand for communication lines having a capacity of over 100 Gbps is increasing.

The operating frequency of a logic device in a packet communication apparatus is elevated with the increase in traffic volume; however, the operating frequency of an FPGA (Field-Programmable Gate Array), which is an example of a logic device, is limited to about 300 MHz at most. For this reason, to install a 100-Gbps line with an FPGA, the FPGA is required to process packets in the order of 2 clks per packet.

To implement a packet management function such as a bandwidth control function or a statistical counting function in a logic device, the logic device sorts the information on packets by flow to store it in an information storage medium (hereinafter, referred to as a table) and at every arrival of a packet, updates a value in the table specific to the flow which is associated with the incoming packet.

For example, to perform the bandwidth control function, the logic device manages the bandwidth consumed by each flow in a table. Specifically, the logic device reads a bandwidth allocated to a flow (allocated bandwidth) and a bandwidth consumed by the flow (consumed bandwidth) from the table (a. table RD) at every arrival of a packet, updates the consumed bandwidth and compares the update result with the allocated bandwidth (b. data computation), and writes the update result of the consumed bandwidth to the table (c. table WR).

Hereinafter, updating the table with information about a packet, like the foregoing a. to c., is referred to as table updating.

A common method of updating a table is that a logic device updates the table on a packet-by-packet basis at every arrival of a packet (sequential processing method). In the sequential processing method, the logic device usually takes a certain time (for example, about 10 clks) in the table updating for one packet.

In the field of this invention, there is a background art disclosed in JP 2000-358066 A. The method according to JP 2000-358066 A checks, for each inbound packet, whether another packet from the same source is pending at an individual processing element, and if the result of the checking is positive, forwards the inbound packet to the individual processing element. In other words, JP 2000-358066 A provides a parallel processing technique that a plurality of parallel processing modules process packets of a plurality of flows.

SUMMARY

In a logic device employing a sequential processing method, if a packet arrival interval is longer than the time taken by table updating for one packet, the logic device can perform table updating at every arrival of a packet.

However, if the capacity of the communication line is increased and the packet arrival interval is shorter than the time taken by table updating for one packet, a packet arrives before completion of table updating for the previous packet. Accordingly, the logic device cannot perform table updating properly for continuously arriving packets.

The technique of JP 2000-358066 A distributes packets to a plurality of parallel processing modules depending on the flow for each parallel processing module to perform table updating; accordingly, it is less frequent for one parallel processing module to successively receive packets. However, if two packets of the same flow successively arrive at an interval shorter than the time required for table updating, the packets of the same flow are forwarded to the same parallel processing module.

Hence, like in the aforementioned sequential processing method, the logic device employing parallel processing modules may not be able to perform proper table updating for a plurality of successively arriving packets of the same flow. Since table updating for a packet of a different flow is not performed until the completion of table updating for the plurality of successively arriving packets of the same flow, a problem arises that overall table updating for the packets might not be performed properly.

In the meanwhile, each parallel processing module may have a table divided by flow to independently perform table updating for a flow. However, the number of flow IDs in a network system is not a fixed value; if flow-specific tables and parallel processing modules are initially configured in a logic device, the expense for the configuration is elevated and the general versatility of the logic device is lost.

This invention has been achieved in view of these problems and aims to provide, in processing packets arriving at an interval shorter than the time required to update information held in an information storage medium, a method of processing successively arriving packets even if the information on the same flow is required to be updated at every packet arrival, for example, by the statistical counting function.

An aspect of this invention is a communication apparatus connected with a network. The communication apparatus includes an input interface for receiving packets sent from the network, a plurality of parallel processing modules for executing processing for the packets, a parallel processing assignment module for assigning the processing for the packets to the parallel processing modules on a packet-by-packet basis, and a computation table including values indicating results of execution of the processing for the packets and flow IDs assigned to the packets. Each of the parallel processing module holds a result of execution of processing for a packet performed by the parallel processing module. The parallel processing assignment module holds a used flow management list including the flow IDs assigned to the packets for which the parallel processing modules execute processing and values indicating statuses of the processing for the packets in the parallel processing modules. Upon receipt of a first packet, the parallel processing assignment module determines whether processing for a second packet assigned the flow ID associated with the first packet is being executed based on the used flow management list and a flow ID assigned to the first packet. The parallel processing assignment module determines a parallel processing module to execute processing for the first packet and a parameter to be included in a notice of assignment to be sent to the determined parallel processing module in accordance with the result of the determination. The parallel processing assignment module includes information about the first packet in the notice of assignment to send the notice of assignment to the determined parallel processing module. The determined parallel processing module acquires, upon receipt of the notice of assignment, a result of execution of the processing for the second packet from either one of the computation table and the result of execution of the processing held in the parallel processing module in accordance with the received notice of assignment. The determined parallel processing module executes the processing for the first packet using the acquired result of execution of the processing for the second packet and the information included in the notice of assignment. The determined parallel processing module updates the computation table with a result of execution of the processing for the first packet.

According to an aspect of this invention, successively arriving packets can be processed even if the packet arrival interval is shorter than the time to update information in an information storage medium.

BRIEF DESCRIPTION OF THE DRAWINGS

The above and other objects, advantages and features of the present invention will be more apparent from the following description taken in conjunction with the accompanying drawings, in which:

FIG. 6 is an explanatory diagram illustrating a used flow management list in Embodiment 1;

FIG. 7 is an explanatory diagram illustrating a setting table in Embodiment 1;

FIG. 8 is an explanatory diagram illustrating a computation table in Embodiment 1;

FIG. 14 is a block diagram illustrating a physical configuration of a packet communication apparatus in Embodiment 2 and a logic device in the packet communication apparatus;

FIG. 16 is an explanatory diagram illustrating a bandwidth setting table in Embodiment 2;

FIG. 17 is an explanatory diagram illustrating a computation result storage table in Embodiment 2;

FIG. 23 is an explanatory diagram illustrating a statistical information table in Embodiment 3;

DETAILED DESCRIPTION OF THE EMBODIMENTS

Hereinafter, embodiments of this invention are described with reference to the accompanying drawings.

Embodiment 1

Specific examples of relationships between the packet arrival interval and the time required for table updating (table update time length) are explained as follows.

Figure 1A:
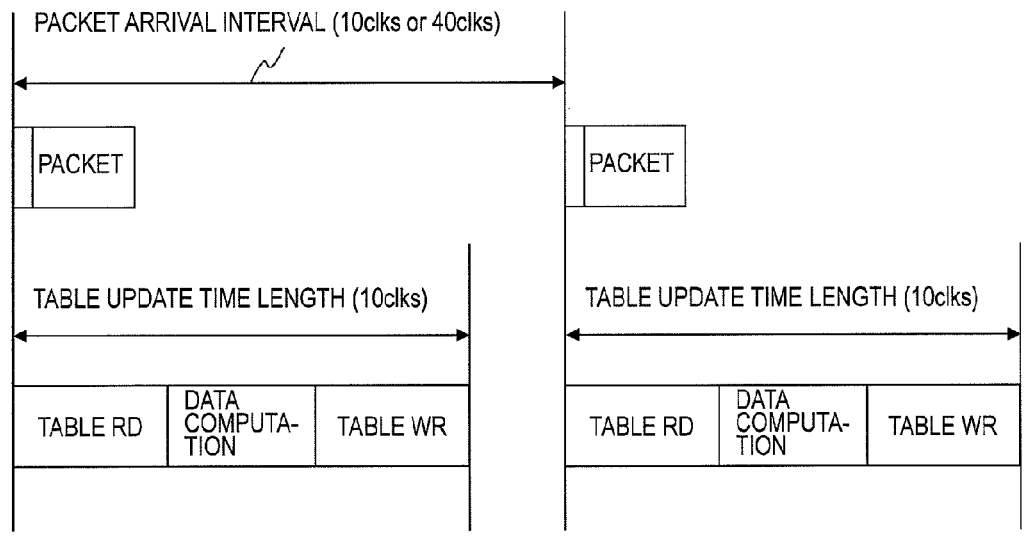
FIG. 1A is an explanatory diagram illustrating table updating in the case where the packet arrival interval is longer than the table update time length in Embodiment 1.

FIG. 1A is an explanatory diagram illustrating table updating in the case where the packet arrival interval is longer than the table update time length in Embodiment 1.

For example, if the packet arrival interval is 10 clks or more and the table update time length is 10 clks or more, the packet communication apparatus in this embodiment can perform table updating at every arrival of a packet. This corresponds to a case where the packet arrival interval is 40 clks in 1-Gbps lines or 10 clks in 10-Gbps lines, and the table update time length is 10 clks.

Figure 1B:
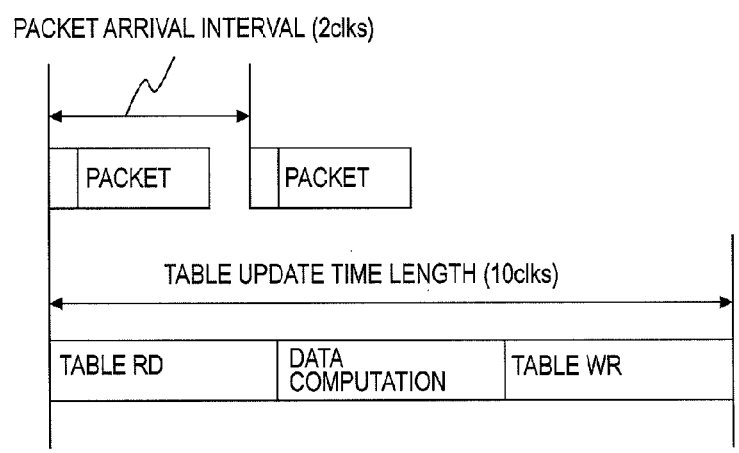
FIG. 1B is an explanatory diagram illustrating receiving packets in the case where the packet arrival interval is shorter than the table update time length in Embodiment 1.

FIG. 1B is an explanatory diagram illustrating receiving packets in the case where the packet arrival interval is shorter than the table update time length in Embodiment 1.

For example, if the packet arrival interval in a 100-Gbps line is 2 clks and the table update time length is 10 clks, the second packet arrives at the packet communication apparatus before completion of table updating after arrival of the first packet. In this case, the second packet is discarded; accordingly, the table updating for the second packet is not performed.

Hereinafter, Embodiment 1 is described with reference to FIGS. 2 to 13. It should be noted that Embodiment 1 described hereinafter is one of the embodiments of this invention and is not to limit this invention.

The packet communication apparatus in this embodiment implements a parallel processing method explained hereinafter; upon arrival of a packet of a flow, the apparatus updates information on the flow in an information storage medium (table).

Figure 2:
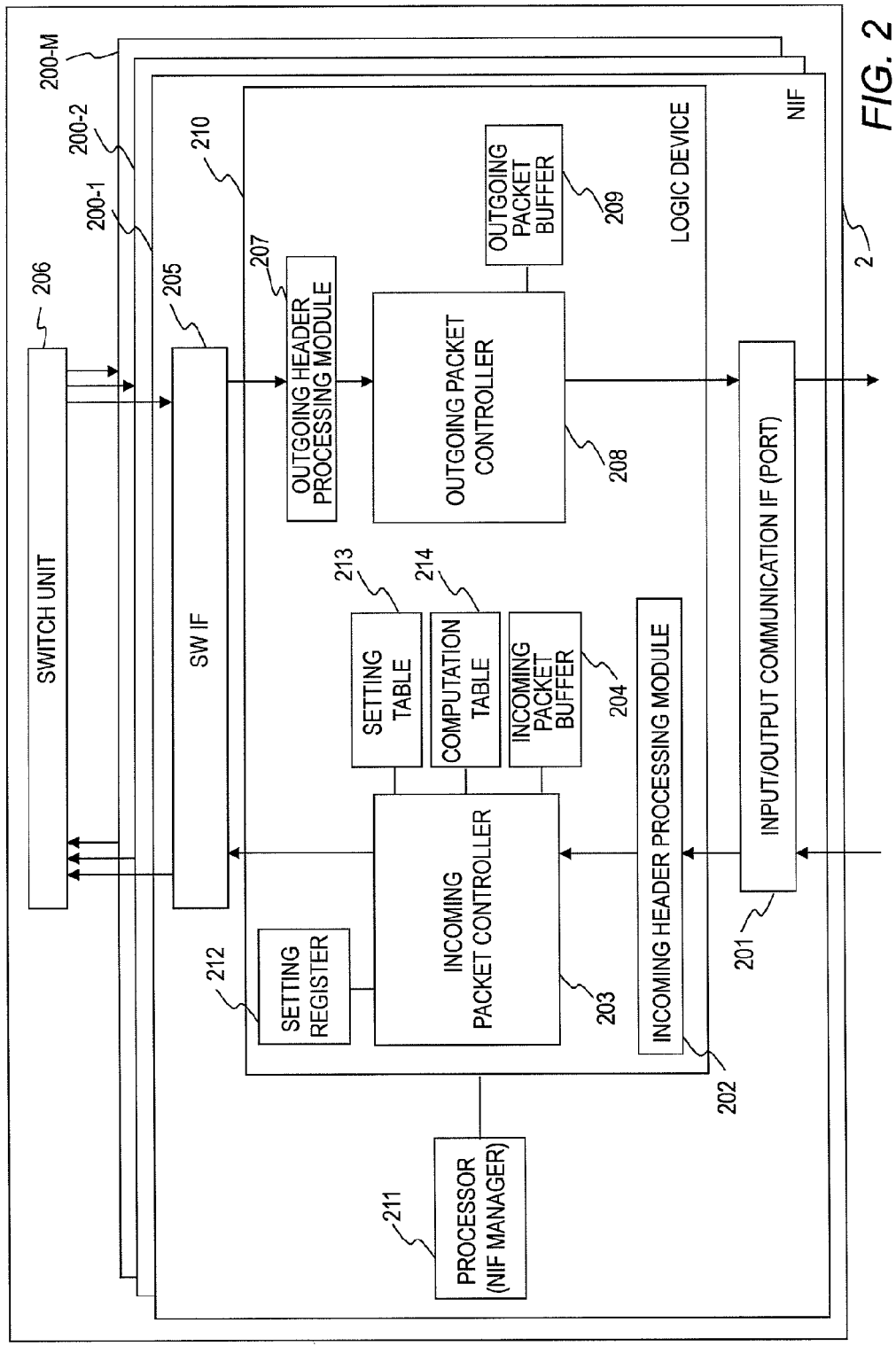
FIG. 2 is a block diagram illustrating a physical configuration of a packet communication apparatus in Embodiment 1 and a logic device in the packet communication apparatus.

FIG. 2 is a block diagram illustrating a physical configuration of a packet communication apparatus 2 in Embodiment 1 and a logic device 210 in the apparatus 2.

The packet communication apparatus 2 in this embodiment is an apparatus to transfer packets to other packet communication apparatuses. The packet communication apparatus 2 includes a plurality of network interface boards (NIFs) 200-1 to 200-M and a switch unit 206.

Each NIF 200 is an interface for receiving packets from a network and sending packets to the network. The switch unit 206 is connected with the NIFs 200 and is a device for forwarding a packet received from an NIF 200 to a different NIF 200 to send the packet.

Each NIF 200 includes an input/output communication interface 201, a SW interface 205, a logic device 210, and an NIF manager 211.

The input/output communication interface 201 is a communication port. The packet communication apparatus 2 connects to a different packet communication apparatus via the input/output communication interface 201 and a network. The input/output communication interface 201 in Embodiment 1 is a communication interface for Ethernet.

The SW interface 205 is a device to connect to the switch unit 206.

The NIF manager 211 is a processor such as a CPU. The NIF manager 211 controls processing in the logic device 210.

The logic device 210 is a circuit for processing packets in this embodiment. The logic device 210 includes at least one memory and at least one computing device (such as a processor).

The logic device 210 includes processing modules such as an incoming header processing module 202, an incoming packet controller 203, an outgoing header processing module 207, and an outgoing packet controller 208, and further includes a setting register 212. The memory included in the logic device 210 holds a setting table 213, a computation table 214, an incoming packet buffer 204, and an outgoing packet buffer 209.

A packet received by the packet communication apparatus 2 is transferred to the input/output communication interface 201, the incoming header processing module 202, the SW interface 205, the switch unit 206, the SW interface 205, the incoming packet controller 203, the outgoing header processing module 207, the outgoing packet controller 208, and the input/output communication interface 201, in this order.

The processing modules included in the logic device 210 may be implemented by a physical device such as an integrated circuit or by a program executed by at least one processor. Some of the processing modules (for example, the incoming packet controller 203 and the incoming header processing module 202) may be implemented by one device or a program; one processing module may be implemented by a plurality of devices or programs.

The NIF manager 211 controls the setting register 212. The setting register 212 has a storage area for transitorily storing data and holds the register values of the processing modules in the logic device 210.

FIG. 2 shows only the connection between the setting register 212 and the incoming packet controller 203, but the setting register 212 is connected with all the processing modules included in the logic device 210 within the logic device 210. The following description omits the explanation about the processing of the setting register 212 but all the processing modules in the logic device 210 performs their processing using the setting register 212.

The input/output communication interface 201 adds a later-described in-apparatus header 3 to the received packet 4.

Figure 3:
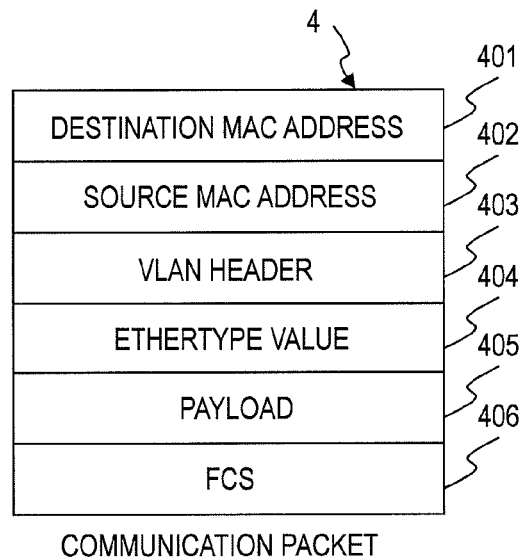
FIG. 3 is an explanatory diagram illustrating a format of a packet used in communications in Embodiment 1.

FIG. 3 is an explanatory diagram illustrating a format of a packet 4 used in communications in Embodiment 1.

The format of the packet 4 shown in FIG. 3 is merely an example and the packet used in this embodiment may include any information. For example, the MAC addresses may be replaced by IP addresses.

The packet 4 includes a destination MAC address 401, a source MAC address 402, a VLAN header 403, an Ethertype value 404, a payload 405, and a frame check sequence (FCS) 406.

In the destination MAC address 401 or the source MAC address 402, the MAC address of the packet communication apparatus 2 is set. In the VLAN header 403, a VLAN ID to be the identifier of the flow is set.

In an example, the payload 405 may include an MPLS header or a header according to a different protocol and an MPLS label value or the like may be set for the VLAN ID of the flow identifier. In the frame check sequence (FCS) 406, values to detect an error in the frame are set.

Figure 4:
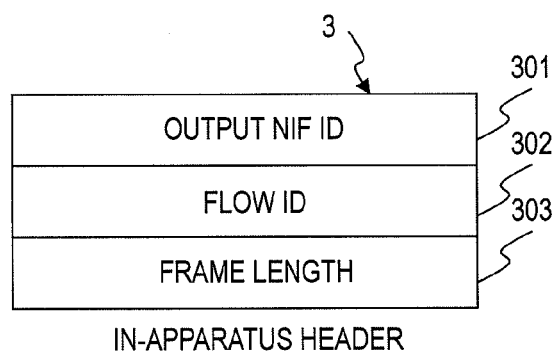
FIG. 4 is an explanatory diagram illustrating a format of an in-apparatus header added to a packet in Embodiment 1.

FIG. 4 is an explanatory drawing illustrating a format of an in-apparatus header 3 added to the packet 4 in Embodiment 1.

The input/output communication interface 201 adds an in-apparatus header 3 to a received packet 4 to process the received packet 4 in the packet communication apparatus 2. The packet 4 including the added in-apparatus header 3 and transmitted toward the switch unit 206 is referred to as an incoming packet in the following description.

The in-apparatus header 3 includes an output network interface board identifier (output NIF ID) 301, a flow ID 302, and a frame length 303.

The output NIF ID 301 is internal routing information. The internal routing information in this embodiment is information indicating which NIF 200 in the packet communication apparatus 2 should output, from the port thereof, the packet 4 received by the packet communication apparatus 2. The switch unit 206 transfers the incoming packet sent to the switch unit 206 to the SW interface 205 of the NIF 200 specified by the internal routing information.

When adding an in-apparatus header 3 to a received packet 4, the input/output communication interface 201 stores values such as null values in the output NIF ID 301 and the flow ID 302. That is to say, the input/output communication interface 201 does not determine the values to be stored in the output NIF ID 301 and the flow ID 302. Values for the output NIF ID 301 and the flow ID 302 are stored by the incoming header processing module 202.

The input/output communication interface 201 acquires the frame length of the received packet 4 and stores the acquired frame length in the frame length 303 in the in-apparatus header 3. Then, the input/output communication interface 201 sends the packet 4 to the incoming header processing module 202.

The incoming header processing module 202 identifies the flow of the packet 4 with reference to the VLAN header 403 of the incoming packet received from the input/output communication interface 201. The incoming header processing module 202 processes the VLAN tag based on the identified flow and stores values in the output NIF ID 301 and the flow ID 302 of the incoming packet.

The VLAN tag processing is transfer, convert, addition, or deletion of the VLAN tag. That is to say, the VLAN tag processing is to convert the VLAN header in the incoming packet into the VLAN header of the packet output from the packet communication apparatus 2.

In the VLAN tag processing, the incoming header processing module 202 may overwrite the destination MAC address 401 and the source MAC address 402 with the values assigned to the input/output communication interface 201 or preregistered values specific to the flow.

After processing the VLAN tag and adding the output NIF ID 301 and the flow ID 302 to the in-apparatus header 3, the incoming header processing module 202 sends the incoming packet to the incoming packet controller 203.

The incoming packet controller 203 stores the incoming packet received from the incoming header processing module 202 in the incoming packet buffer 204. At this time, the incoming packet controller 203 performs later-described packet processing on the received incoming packet using the setting table 213 and the computation table 214.

After the packet processing, the incoming packet controller 203 retrieves the incoming packet held in the incoming packet buffer 204 and sends it to the SW interface 205. The SW interface 205 transfers the received incoming packet to the switch unit 206.

Upon receipt of the incoming packet from the SW interface 205 in an NIF 200, the switch unit 206 identifies the destination NIF 200 to transfer the received incoming packet with reference to the output NIF ID 301 in the received incoming packet. Next, the switch unit 206 transfers the received incoming packet as an outgoing packet to the SW interface 205 associated with the identified NIF 200.

In this embodiment, the packet 4 transmitted from the switch unit 206 toward the input/output communication interface 201 is referred to as an outgoing packet.

The SW interface 205 transfers the received outgoing packet to the outgoing header processing module 207.

In the forgoing description, the incoming header processing module 202 converts the header (format) of the incoming packet into a header (format) of the packet to be output from the packet communication apparatus 2. Instead of the incoming header processing module 202, however, the outgoing header processing module 207 in this embodiment may perform this conversion into the header of the outgoing packet.

If the header conversion (format conversion) has already been performed by the incoming header processing module 202, the outgoing header processing module 207 transfers the outgoing packet received from the SW interface 205 to the outgoing packet controller 208 as it is.

In the forgoing description, the incoming packet controller 203 performs the packet processing. Instead of the incoming packet controller 203, however, the outgoing packet controller 208 may store the outgoing packet in the outgoing packet buffer 209 and further, may perform the packet processing.

In the case where the outgoing packet controller 208 performs packet processing, the outgoing packet controller 208 retrieves the outgoing packet held in the outgoing packet buffer 209 after processing the packet. Then, it forwards the retrieved outgoing packet to the input/output communication interface 201.

In the case where the outgoing packet controller 208 does not perform the packet processing, the outgoing packet controller 208 transfers the outgoing packet received from the outgoing header processing module 207 to the input/output communication interface 201 as it is.

The input/output communication interface 201 removes the in-apparatus header 3 from the received outgoing packet. Then, the input/output communication interface 201 transfers the outgoing packet to a different apparatus in the format of the packet 4 shown in FIG. 3.

Figure 5:
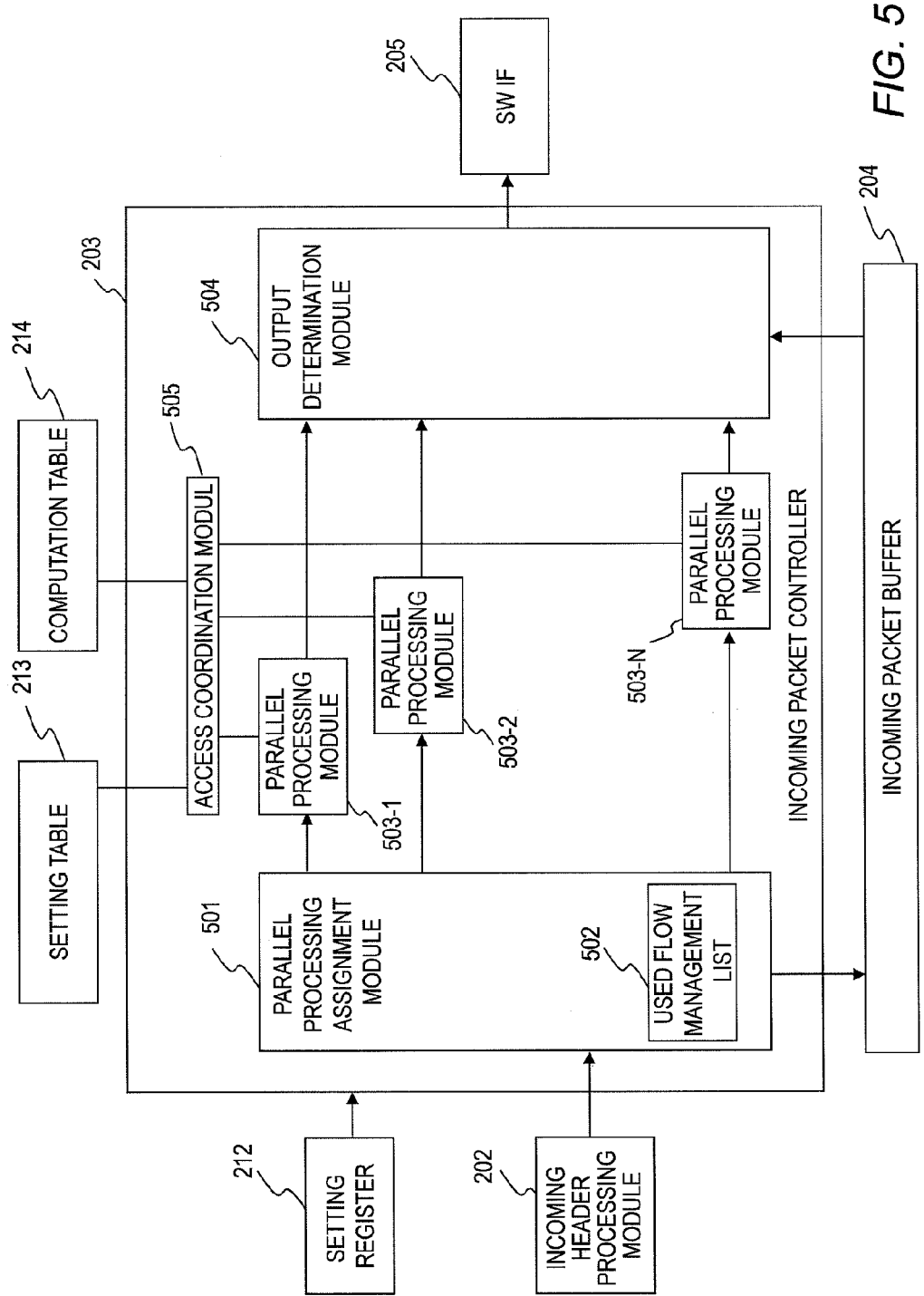
FIG. 5 is a block diagram illustrating a logical configuration of an incoming packet controller in Embodiment 1.

FIG. 5 is a block diagram illustrating a logical configuration of the incoming packet controller 203 in Embodiment 1.

The incoming packet controller 203 includes a parallel processing assignment module 501, a used flow management list 502, a plurality of parallel processing modules 503 (503-1 to 503-N), an output determination module 504, and an access coordination module 505.

The parallel processing assignment module 501 is a processing module for performing later-described processing assignment S950 when the incoming packet controller 203 receives an incoming packet from the incoming header processing module 202. In the processing assignment S950, the parallel processing assignment module 501 identifies the flow based on the flow ID 302 in the in-apparatus header 3 of the incoming packet and refers to the used flow management list 502 to determine the parallel processing module 503 to perform the table updating for the incoming packet from the parallel processing modules 503-1 to 503-N.

The parallel processing assignment module 501 holds the used flow management list 502 in a memory included in the logic device 210 or other device. The parallel processing assignment module 501 updates the used flow management list 502 in the later-described processing assignment S950 and used flow management S1050. Furthermore, the parallel processing assignment module 501 stores a received incoming packet in the incoming packet buffer 204 upon receipt of it.

The used flow management list 502 indicates flow IDs of incoming packets processed by individual parallel processing modules 503 and the statuses of the processing by the individual parallel processing modules 503.

Each parallel processing module 503 updates information on a flow included in the computation table 214 in later-described table updating S1150. The parallel processing module 503 sends a determination of the processing of table updating S1150 to the output determination module 504. The incoming packet controller 203 includes N units of parallel processing modules 503 (where N is any natural number).

In this embodiment, the table update time length required for table updating S1150 by the parallel processing module 503 is predetermined. The incoming packet buffer 204 (or the outgoing packet buffer 209) in this embodiment is used as a shift register by the parallel processing assignment module 501 and the output determination module 504.

Furthermore, the number N of the parallel processing modules 503 is determined based on the table update time length and the shortest packet arrival interval. The shortest packet arrival interval is a value predetermined depending on the communication line connected from the packet communication apparatus 2.

For example, if the table update time length is 10 clks and the shortest packet arrival interval is 2 clks, the result of dividing the table update time length by the shortest packet arrival interval (and rounding up the remainder) is 5. Accordingly, the number N of parallel processing modules 503 is predetermined to be 5.

The output determination module 504 performs later-described output determination S1250 and receives a notice of completion of the computation and a determination of the processing from the parallel processing module 503 (one of 503-1 to 503-N). The output determination module 504 retrieves an incoming packet from the incoming packet buffer 204 and converts the header or payload of the retrieved incoming packet based on the determination of the processing. Thereafter, the output determination module 504 sends the incoming packet to the SW interface 205.

The access coordination module 505 coordinates the accesses (retrievals and write-backs) of the parallel processing modules 503-1 to 503-N to the setting table 213 and the computation table 214. Although the following description omits the details of the processing of the access coordination module 505, when the parallel processing modules 503 are going to access the setting table 213 or the computation table 214, the access coordination module 505 coordinates the accesses.

FIG. 6 is an explanatory diagram illustrating the used flow management list 502 in Embodiment 1.

The used flow management list 502 includes columns of parallel processing modules 601, flow IDs 602, and processing status counters 603.

The column of parallel processing modules 601 includes identifiers uniquely representing the parallel processing modules 503-1 to 503-N. The parallel processing modules 601 in this embodiment indicate values for identifying the parallel processing modules 503 by numerical values. The values stored in the parallel processing modules 601 are predetermined, for example, by the administrator.

The column of flow IDs 602 includes flow IDs uniquely representing the flows assigned to the incoming packets processed by the parallel processing modules 503. The values stored in the flow IDs 602 are updated by the parallel processing assignment module 501. The values stored in the flow IDs 602 correspond to the values in the flow IDs 302 of in-apparatus headers 3 stored by the incoming header processing module 202.

The column of processing status counters 603 includes values indicating the statuses of table updating by the parallel processing modules 503. The processing status counters 603 in this embodiment indicate values of the processing time passed since the start of the table updating.

Each processing status counter 603 in the following description indicates the remaining time until the completion of the table updating by means of a subtraction counter. Specifically, when table updating is started, the table update time length is stored in the processing status counter 603. The parallel processing assignment module 501 subtracts a unit time (1 clk in this embodiment) from the value in the processing status counter 603 at every unit time.

An entry holding "0" in the processing status counter 603 indicates that the parallel processing module 503 identified by the parallel processing module 601 has completed table updating. An entry holding a positive value other than "0" in the processing status counter 603 indicates that the parallel processing module 503 identified by the parallel processing module 601 is processing table updating.

The following description is about processing assuming that the processing status counter 603 is a subtraction counter, but the processing status counter 603 may indicate a time passed since the start of the table updating. In this case, the parallel processing assignment module 501 may determine the status of table updating by comparing the processing status counter 603 with the predetermined table update time length.

FIG. 7 is an explanatory diagram illustrating the setting table 213 in Embodiment 1.

The values stored in the setting table 213 are setting values to be used in table updating by the parallel processing modules 503; they are predetermined, for example, by the administrator. The setting table 213 includes columns of flow IDs 701 and setting information 702.

The column of flow IDs 701 includes flow IDs uniquely representing the flows assigned to incoming packets. The values stored in the flow IDs 701 correspond to the values in the flow IDs 302 of in-apparatus headers 3 stored by the incoming header processing module 202.

The setting information 702 indicates information used in table updating. Specifically, the setting information 702 represents setting values to be used to update a computation result in table updating by a parallel processing module 503.

FIG. 8 is an explanatory diagram illustrating the computation table 214 in Embodiment 1.

The computation table 214 includes columns of flow IDs 801 and computation results 802.

The column of flow IDs 801 includes flow IDs uniquely representing the flows assigned to incoming packets. The values stored in the flow IDs 801 correspond to the values in the flow IDs 302 of in-apparatus headers 3 stored by the incoming header processing module 202.

Each computation result 802 indicates a result of flow-specific packet processing, namely, a result of table updating for the flow. The value stored in the computation result 802 is updated in table updating by the parallel processing module 503.

Described hereinafter is processing assignment S950 performed by the parallel processing assignment module 501.

Figure 9:
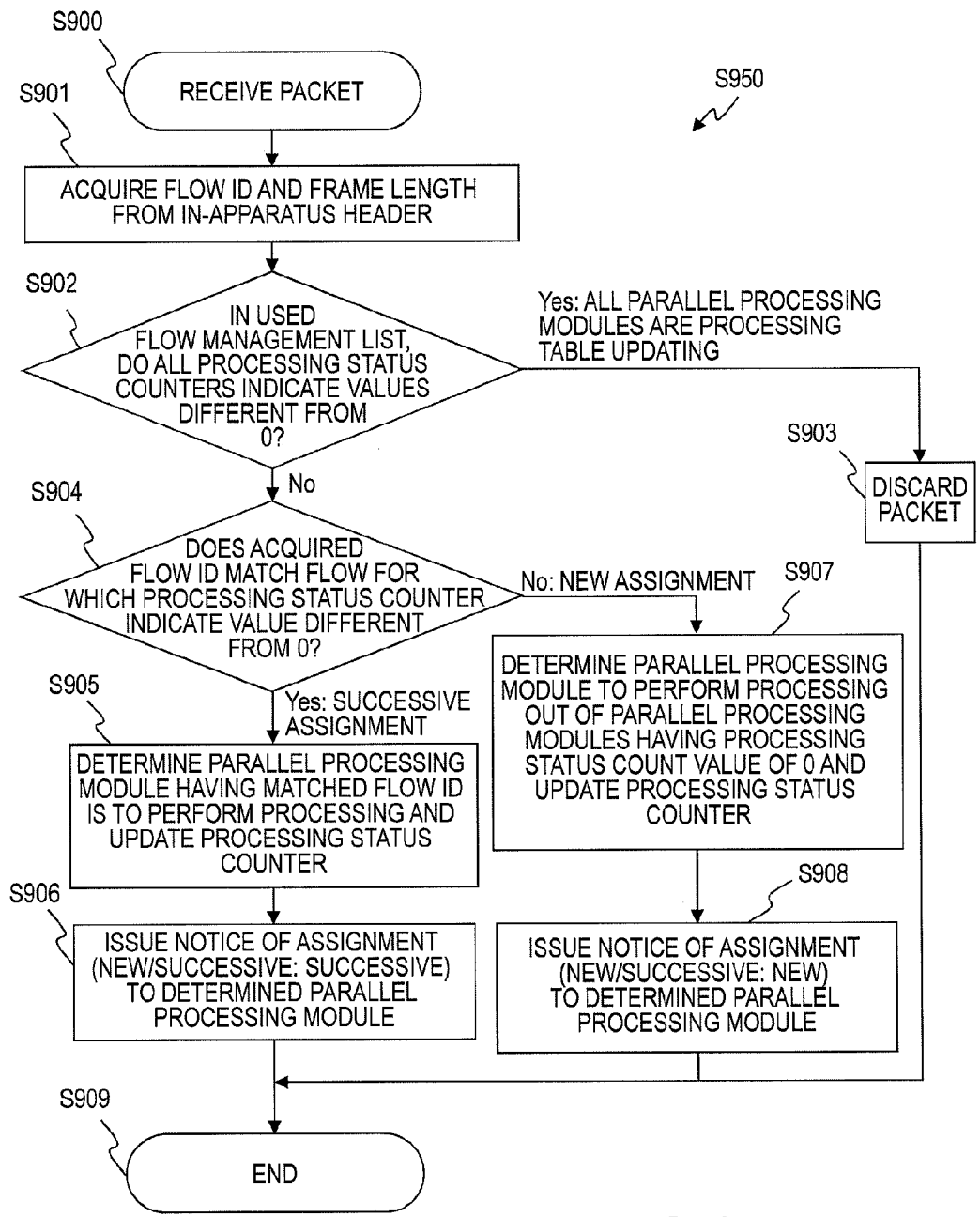
FIG. 9 is a flowchart illustrating processing assignment performed by a parallel processing assignment module in Embodiment 1.

FIG. 9 is a flowchart illustrating processing assignment S950 performed by the parallel processing assignment module 501 in Embodiment 1.

Upon receipt of an incoming packet from the incoming header processing module 202 (S900), the parallel processing assignment module 501 acquires values of the flow ID 302 and the frame length 303 from the in-apparatus header 3 included in the received incoming packet (S901).

After S901, the parallel processing assignment module 501 refers to the used flow management list 502 to determine whether the value in the processing status counter 603 in each entry is different from "0" (S902).

If it is determined at S902 that the processing status counter values in all entries of the used flow management list 502 are different from "0", all the parallel processing modules 503 are performing table updating. Accordingly, the parallel processing assignment module 501 discards the incoming packet (S903) and terminates the processing assignment S950 shown in FIG. 9 (S909).

If, at S902, the used flow management list 502 includes some entry containing a non-zero value in the processing status counter 603, at least one parallel processing module 503 of all the parallel processing modules 503 is not performing table updating. Hence, the parallel processing assignment module 501 determines whether the value of the flow ID 302 acquired at S901 matches the value of the flow ID 602 of the entry containing the value different from 0 in the processing status counter 603 (S904).

In this connection, the parallel processing assignment module 501 may determine at S904 that the acquired value of the flow ID 302 matches the value of the flow ID 602 of the entry containing a value different from 0 in the processing status counter 603 if a value corresponding to the value of the flow ID 302 acquired at S901 matches the value of the flow ID 602 of the entry containing the value different from 0 in the processing status counter 603.

If it is determined at S904 that the value of the flow ID 302 acquired at S901 does not match the value of the flow ID 602 of the entry containing a value different from 0 in the processing status counter 603, the parallel processing assignment module 501 performs S907 so that a parallel processing module that is not performing table updating is to newly perform table updating for the incoming packet.

If it is determined at S904 that the value of the flow ID 302 acquired at S901 matches the value of the flow ID 602 of the entry containing a value different from 0 in the processing status counter 603, the parallel processing module 503 handling the flow of the incoming packet can successively perform table updating for the incoming packet. Accordingly, the parallel processing assignment module 501 determines that the parallel processing module 503 identified by the parallel processing module 601 of the entry including the flow ID 602 matching the acquired flow ID 302 is to successively perform table updating for the incoming packet.

The parallel processing assignment module 501 then updates the processing status counter 603 of the entry including the flow ID 602 matching the acquired value of the flow ID 302 with a value indicating the table update time length (S905). For example, if the table update time length is 10 clks, the parallel processing assignment module 501 updates the processing status counter 603 of the entry including the flow ID 602 matching the acquired value of the flow ID 302 with "10".

By updating the processing status counter 603 at S905, the parallel processing assignment module 501 can store a value indicating whether the parallel processing module 503 has completed table updating in the processing status counter 603.

After S905, the parallel processing assignment module 501 issues a notice of assignment including a processing start trigger, a new/successive parameter, the acquired flow ID, and the acquired frame length to the parallel processing module 503 identified by the parallel processing module 601 of the entry in the used flow management list 502 including the value of the flow ID 602 matching the acquired value of the flow ID 302 (S906).

At S906, the parallel processing assignment module 501 determines the new/successive parameter to be a value indicating successive processing ("successive") and includes the new/successive parameter indicating "successive" (a value 1 in this embodiment) in the notice of assignment. The new/successive parameter in this embodiment is a value for notifying the parallel processing module 503 of which type of table updating is to be performed.

After S906, the parallel processing assignment module 501 terminates the processing assignment S950 shown in FIG. 9 (S909).

If it is determined at S904 that the value of the flow ID 302 acquired at S901 does not match the value of the flow ID 602 of the entry containing a value different from 0 in the processing status counter 603, the parallel processing assignment module 501 refers to the used flow management list 502 to extract the entry containing a value of the smallest number in the parallel processing module 601 from the entries containing "0" in the processing status counter 603. The parallel processing assignment module 501 determines that the parallel processing module 503 identified by the parallel processing module 601 of the extracted entry is to newly perform table updating for the incoming packet.

The parallel processing assignment module 501 updates the flow ID 602 of the extracted entry with the value of the flow ID 302 acquired at S901. The parallel processing assignment module 501 updates the processing status counter 603 of the extracted entry with the table update time length (S907).

At the foregoing S907, the parallel processing assignment module 501 extracts, in the used flow management list 502, the entry containing a value of the smallest number in the parallel processing module 601 from the entries containing "0" in the processing status counter 603; however, the parallel processing assignment module 501 can extract an entry in accordance with any policy as far as the extracted entry is one of the entries containing "0" in the processing status counter 603 in the used flow management list 502. For example, the parallel processing assignment module 501 may extract the entry containing the greatest number or the entry selected in accordance with the order predetermined by the administrator.

After S907, the parallel processing assignment module 501 issues a notice of assignment including a processing start trigger, a new/successive parameter, the flow ID, and the frame length to the determined parallel processing module 503 (S908). At S908, the parallel processing assignment module 501 determines the new/successive parameter to be a value indicating new processing ("new") and includes the new/successive parameter indicating "new" (a value 0 in this embodiment) in the notice of assignment.

The processing start trigger included in the notice of assignment issued at S906 and S908 is a value indicating start of table updating. The flow ID included in the notice of assignment is the flow ID acquired at S901, namely, the flow ID of the incoming packet. The frame length included in the notice of assignment is the frame length acquired at S901, namely, the frame length of the incoming packet.

After S908, the parallel processing assignment module 501 terminates the processing assignment S950 shown in FIG. 9 (S909).

Described hereinafter is used flow management S1050 performed by the parallel processing assignment module 501.

Figure 10:
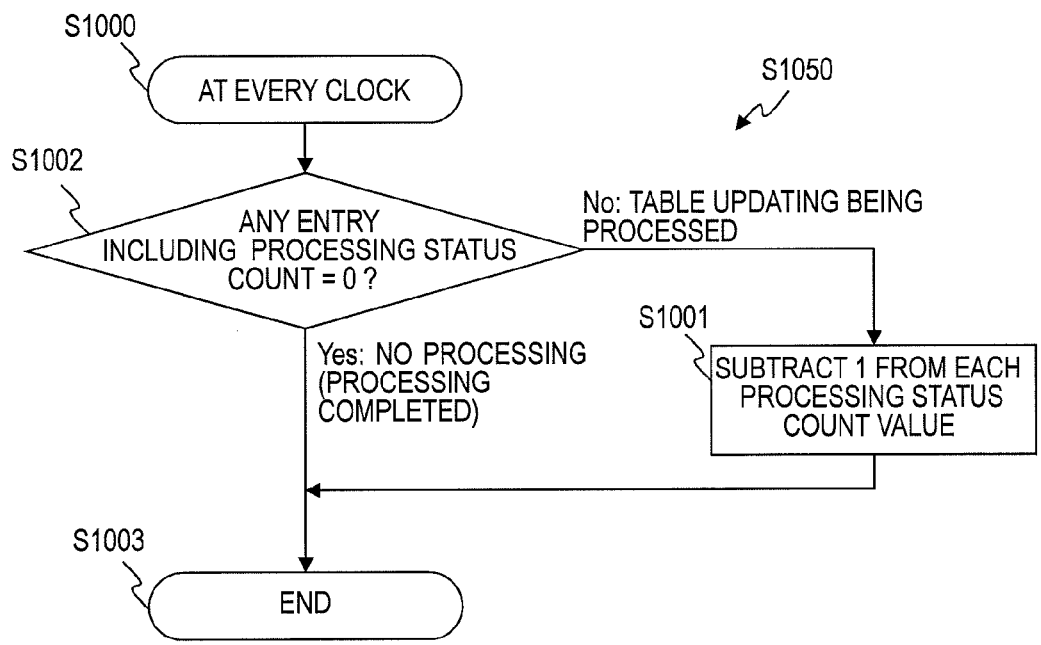
FIG. 10 is a flowchart illustrating used flow management performed by the parallel processing assignment module in Embodiment 1.

FIG. 10 is a flowchart illustrating the used flow management S1050 performed by the parallel processing assignment module 501 in Embodiment 1.

The parallel processing assignment module 501 determines, at every clock (S1000), whether the processing status counter 603 in each entry of the used flow management list 502 indicates "0" (S1001).

If it is determined that the processing status counters 603 of all entries in the used flow management list 502 indicate "0" at S1001, the parallel processing assignment module 501 terminates the used flow management S1050 (S1003).

If it is determined at S1001 that the used flow management list 502 includes some entry containing a non-zero value in the processing status counter 603, the parallel processing assignment module 501 subtracts 1 from each non-zero value included in the processing status counter 603 (S1002). After S1002, the parallel processing assignment module 501 terminates the used flow management S1050 (S1003).

Described hereinafter is table updating S1150 performed by one of the parallel processing modules 503-1 to 503-N.

Figure 11:
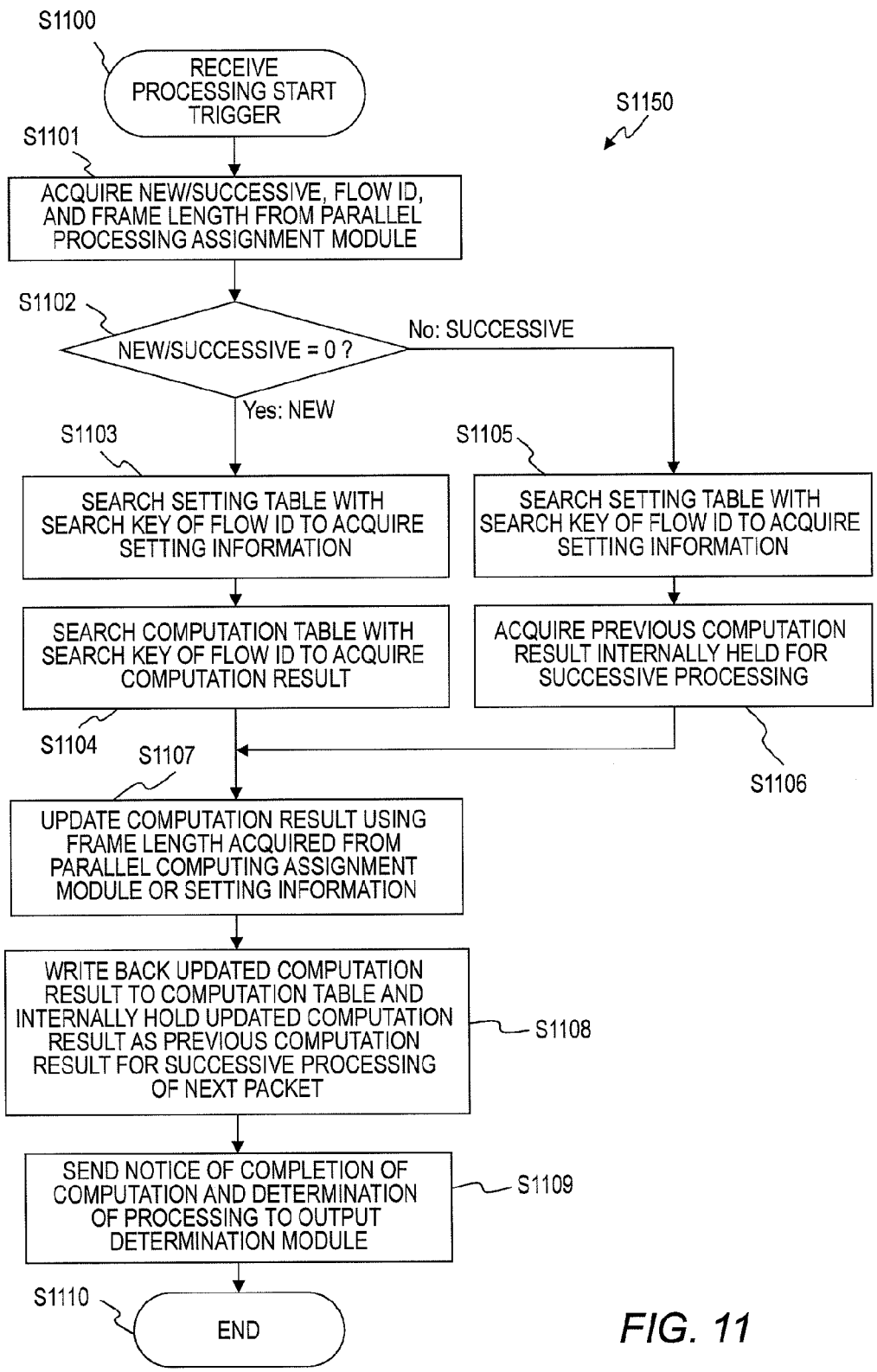
FIG. 11 is a flowchart illustrating table updating performed by a parallel processing module in Embodiment 1.

FIG. 11 is a flowchart illustrating the table updating S1150 performed by the parallel processing module 503 in Embodiment 1.

Upon receipt of a notice of assignment including a processing start trigger from the parallel processing assignment module 501 (S1100), the parallel processing module 503 acquires the new/successive parameter, the flow ID, and the frame length included in the received notice of assignment (S1101).

After S1101, the parallel processing module 503 determines whether the new/successive parameter is "0", namely, whether the new/successive parameter indicates "new" (S1102).

If the new/successive parameter is "0", meaning if it is determined that the new/successive parameter indicates "new" at S1102, the parallel processing module 503 searches the setting table 213 with a search key of the flow ID acquired at S1101, namely, the flow ID of the incoming packet. As a result of the search, the parallel processing module 503 acquires the value of the setting information 702 of the entry in the setting table 213 containing the flow ID of the incoming packet in the flow ID 701 (S1103). Through this processing, the parallel processing module 503 acquires the value of the setting information 702 for the incoming packet.

After S1103, the parallel processing module 503 searches the computation table 214 with a search key of the flow ID of the incoming packet. As a result of the search, the parallel processing module 503 acquires the value of the computation result 802 of the entry in the computation table 214 containing the flow ID of the incoming packet in the flow ID 801 (S1104). After S1104, the parallel processing module 503 performs the processing at S1107.

If, at S1102, the new/successive parameter is not "0", meaning if it is determined that the new/successive parameter indicates "successive", the parallel processing module 503, like at S1103, searches the setting table 213 with a search key of the flow ID of the incoming packet to acquire the value of the setting information 702 for the incoming packet (S1105).

After S1105, the parallel processing module 503 acquires the previous computation result internally held by the parallel processing module 503 for successive processing (S1106). The previous computation result internally held for successive processing is a computation result that the parallel processing module 503 stores in a memory in the logic device 210, such as the setting register 212, to successively perform next table updating before completion of table updating.

Through S1106 in which the parallel processing module 503 acquires the internally held previous computation result, the parallel processing module 503 can perform table updating based on the latest computation result without accessing the computation table 214. Even if the parallel processing module 503 continuously receives incoming packets of the same flow, table updating can be performed properly.

After S1106, the parallel processing module 503 proceeds to S1107.

In the processing from S1102 to S1106 in FIG. 11, the parallel processing module 503 only acquires information for data computation in table updating; however, the parallel processing module 503 in Embodiment 1 may perform processing differently depending on the value of the new/successive parameter. For example, if the new/successive parameter indicates "new", the parallel processing module 503 may add a value predetermined by the user to the value of the setting information 702 acquired from the setting table 213, after S1104.

This approach allows the computation result to be updated with a value different depending on whether incoming packets arrive successively or not, as requested by the user.

After S1104 or S1106, the parallel processing module 503 updates the computation result acquired at S1104 or S1106 using the frame length included in the received notice of assignment and the setting information 702 acquired from the setting table 213 (S1107).

The method of updating the computation result at S1107 is predetermined, for example, by the administrator. An example of the method of updating the computation result adds the frame length included in the received notice of assignment to the computation result to update the computation result.

At S1107, the parallel processing module 503 compares the updated computation result with a threshold held in the setting information 702 to determine the processing on the incoming packet (such as converting the value included in the header of the incoming packet) based on the result of the comparison. It acquires the determined processing as a determination of the processing.

After S1107, the parallel processing module 503 writes back the updated computation result to the computation result 802 of the entry in the computation table 214 containing the flow ID of the incoming packet in the flow ID 801.

Furthermore, the parallel processing module 503 internally holds the updated computation result as a previous computation result (S1108) for the case where the next notice of assignment indicates successive packet processing (for successive processing of the next packet). Specifically, the parallel processing module 503 stores the updated computation result in a memory included in the logic device 210, such as the setting register 212.

The previous computation result internally held at S1108 allows the parallel processing module 503 to speedily pass over the computation result to the next table updating to be performed upon receipt of the next incoming packet.

After S1108, the parallel processing module 503 sends a notice of completion of computation including values indicating the completion of the computation and the determination of the processing acquired at S1107 to the output determination module 504 (S1109). After S1109, the parallel processing module 503 terminates the table updating S1150 (S1110).

Described hereinafter is output determination S1250 performed by the output determination module 504.

Figure 12:
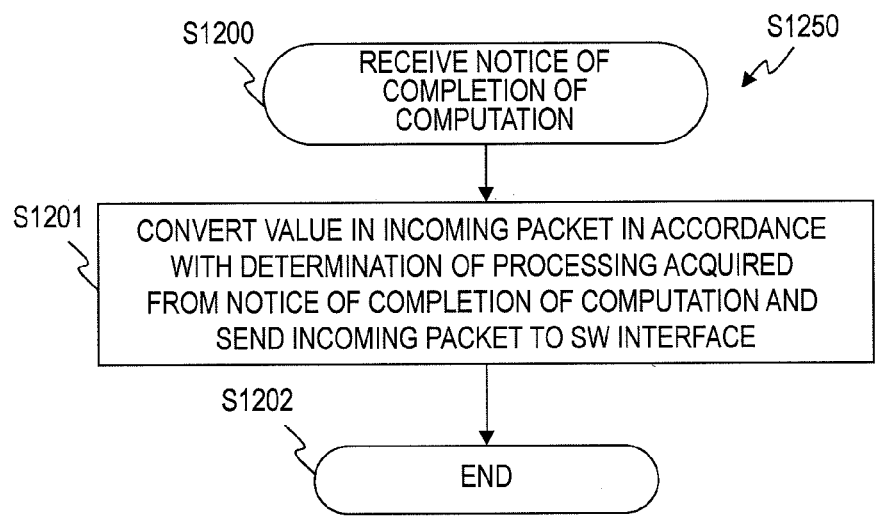
FIG. 12 is a flowchart illustrating output determination performed by an output determination module in Embodiment 1.

FIG. 12 is a flowchart illustrating the output determination S1250 performed by the output determination module 504 in Embodiment 1.

The output determination module 504 receives a notice of completion of computation from one of the parallel processing modules 503-1 to 503-N (S1200).

After S1200, the output determination module 504 converts the value of the VLAN header 403 or payload 405 in the incoming packet retrieved from the incoming packet buffer 204 in accordance with the determination of the processing acquired from the received notice of completion of computation. Thereafter, it sends the incoming packet including the value of the converted VLAN header 403 or payload 405 to the SW interface 205 (S1201).

After S1201, the output determination module 504 terminates the output determination S1250 (S1202).

Through the processing shown in FIG. 12, the output determination module 504 can perform processing, such as header conversion, in accordance with the result of table updating in the parallel processing module 503, on an incoming packet.

Figure 13A:
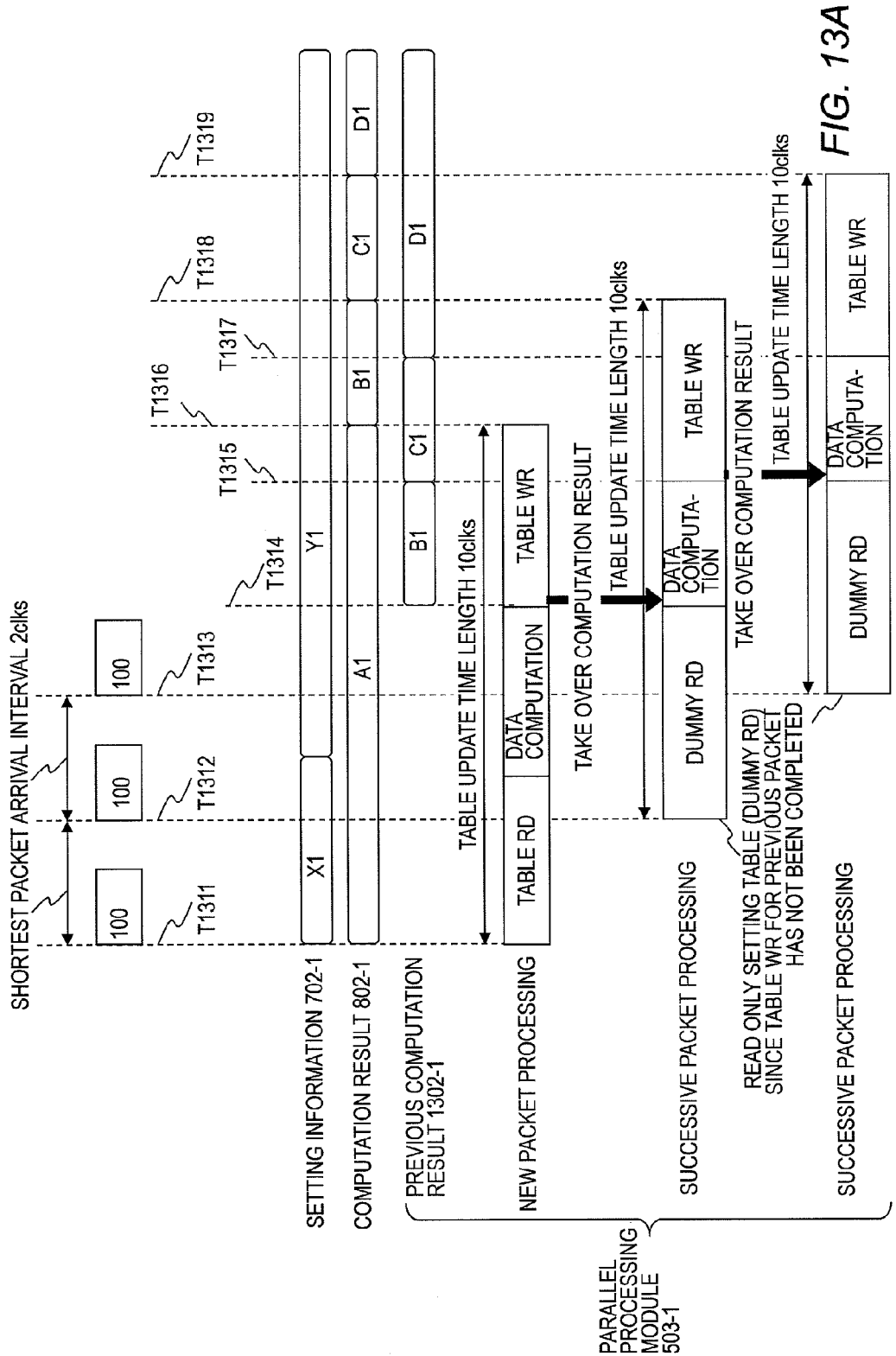
FIG. 13A is an explanatory diagram illustrating computation results in the case where a parallel processing module in Embodiment 1 successively performs table updating.
Figure 13B:
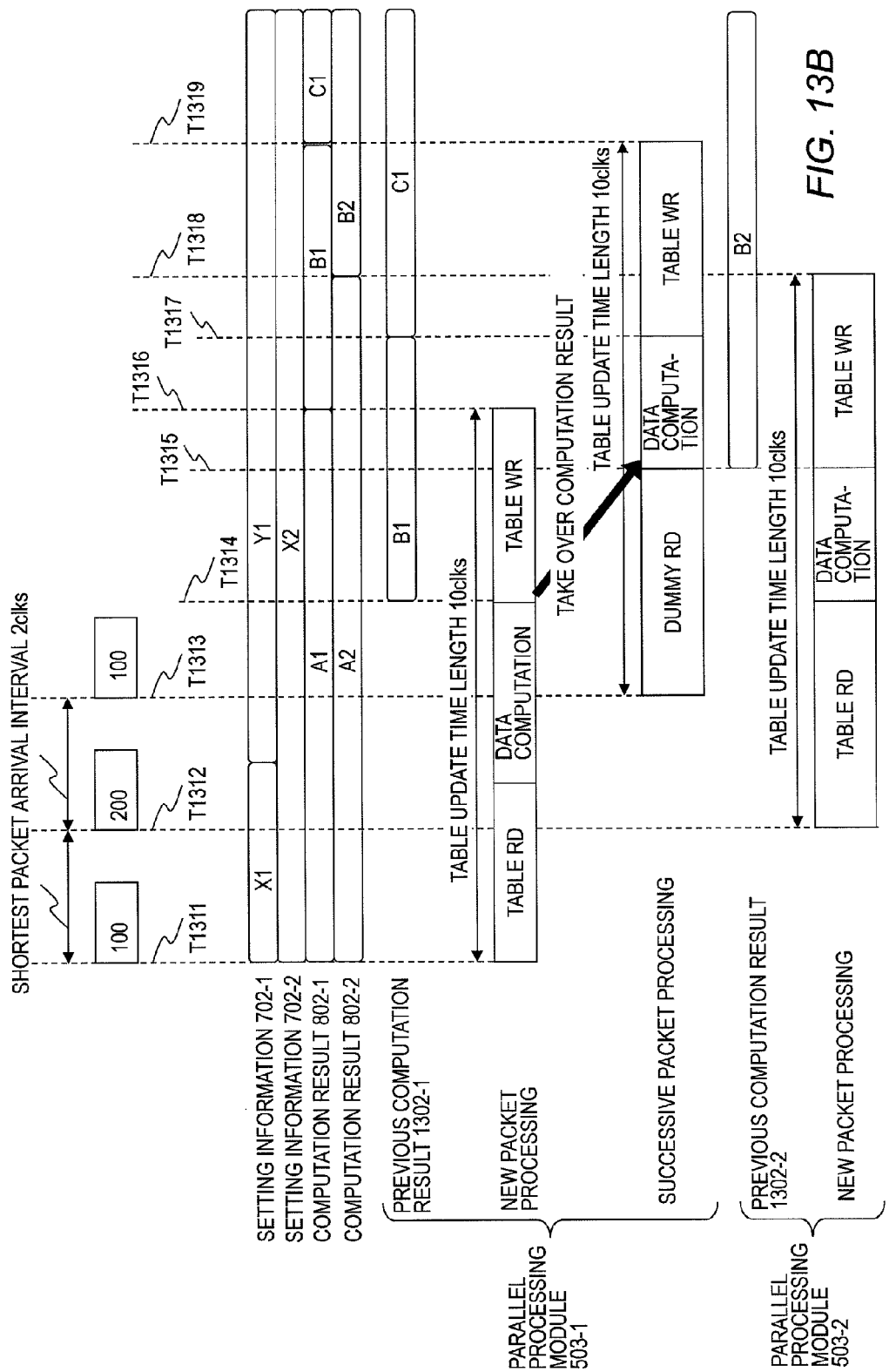
FIG. 13B is an explanatory diagram illustrating computation results in the case where two parallel processing modules in Embodiment 1 perform table updating.

FIGS. 13A and 13B illustrate two examples of transitions of computation results caused by the table updating S1150 shown in FIG. 11.

FIG. 13A is an explanatory diagram illustrating computation results in the case where the parallel processing module 503-1 in Embodiment 1 successively performs the table updating S1150.

Assuming that the table update time length is 10 clks and the shortest packet arrival interval is 2 clks, FIGS. 13A and 13B illustrate examples that the parallel processing module 503-1 successively receives incoming packets of the same flow ID "100" at 2-clk intervals.

In this embodiment, the incoming packet first received by the parallel processing assignment module 501 is referred to as the first packet; the incoming packet received 2 clks later than the first packet is referred to as the second packet; and the incoming packet received 2 clks later than the second packet is referred to as the third packet. In FIG. 13A, the values of the flow IDs 302 of the first packet, the second packet, and the third packet are all "100".

In FIGS. 13A and 13B, the setting information 702-1 is the value of the setting information 702 of the entry in the setting table 213 containing "100" in the flow ID 701 and the computation result 802-1 is the value of the computation result 802 of the entry in the computation table 214 containing "100" in the flow ID 801. The previous computation result 1302-1 is the previous computation result internally held by the parallel processing module 503-1.

The first packet is an incoming packet on which the parallel processing assignment module 501 has determined at S904 that the parallel processing module 503-1 is to newly perform table updating.

When the parallel processing module 503-1 in Embodiment 1 receives a notice of assignment including a new/successive parameter indicating "new", the flow ID of the first packet, the frame length of the first packet, and a processing start trigger from the parallel processing assignment module 501 (T1311), the parallel processing module 503-1 starts searching the setting table 213 and the computation table 214 with a search key of the flow ID "100" of the first packet. As a result of the search, the parallel processing module 503-1 acquires setting information X1 and a computation result A1 (table RD).

The table RD for the first packet corresponds to S1100 to S1104 in FIG. 11.

The parallel processing module 503-1 updates the computation result A1 into a computation result B1 using the setting information X1 and the frame length of the first packet (data computation). The data computation for the first packet corresponds to S1107 in FIG. 11.

When the data computation for the first packet is completed (T1314), the parallel processing module 503-1 starts writing back the computation result B1 to the computation table 214 (table WR). The table WR for the first packet corresponds to S1108.

In general, accessing a table requires some time; accordingly, the write back of the computation result B1 to the computation table 214 ends at T1316. In the table WR, the parallel processing module 503-1 further holds the computation result B1 internally as a previous computation result 1302-1 for successive processing of the next incoming packet (which corresponds to S1108 in FIG. 11).

The second packet is received by the parallel processing assignment module 501 before completion of the table updating for the first packet. Accordingly, the second packet is an incoming packet on which the parallel processing assignment module 501 has determined at S904 that the parallel processing module 503-1 is to successively perform the table updating.

When the parallel processing module 503-1 receives a notice of assignment including a new/successive parameter indicating "successive", the flow ID of the second packet, the frame length of the second packet, and a processing start trigger from the parallel processing assignment module 501 (T1312), the parallel processing module 503-1 starts searching the setting table 213 with a search key of the flow ID "100" of the second packet. As a result of the search, the parallel processing module 503-1 acquires setting information X1 (dummy RD).

The dummy RD for the second packet corresponds to S1100 to S1102, and S1105.

Since, at T1312, the update of computation result in the table updating for the first packet has not been completed yet, the computation result 802-1 is still the computation result A1. For this reason, the parallel processing module 503-1 does not acquire the computation result from the computation table 214 in the table updating for the second packet.

The parallel processing module 503-1 starts dummy RD upon receipt of a notice of assignment including a new/successive parameter indicating "successive". As to the table processing in this embodiment, acquiring only setting information from the setting table 213 without referring to the computation table 214 is referred to as dummy RD.

After the dummy RD, the parallel processing module 503-1 retrieves the previous computation result 1302-1 internally held in the table computation for the first packet to take over the computation result B1 obtained in the previous table updating (T1314). The takeover of the computation result B1 internally held in the table computation for the first packet corresponds to S1106 in FIG. 11.

The parallel processing module 503-1 updates the taken over computation result B1 into a computation result C1 using the setting information X1 and the frame length of the second packet (data computation). The data computation for the second packet corresponds to S1107 in FIG. 11.

When the data computation for the second packet is completed at T1315, the parallel processing module 503-1 starts writing back the computation result C1 to the computation table 214 (table WR). The table WR for the second packet corresponds to S1108 in FIG. 11.

Since accessing a table requires some time, the writing back the computation result C1 to the computation table 214 ends at T1318. In the table WR, the parallel processing module 503-1 further holds the computation result C1 internally as a previous computation result 1302-1 for successive processing of the next incoming packet.

Just as the second packet is a packet received before the completion of the table updating for the first packet, the third packet is a packet received by the parallel processing assignment module 501 before completion of the table updating for the second packet. For this reason, the table updating for the third packet is the same as the table updating for the second packet.

However, the setting information 702-1 in FIG. 13A is updated by the administrator between T1312 and T1313 when the table updating for the third packet is started. Specifically, the value stored in the setting information 702-1 is updated from the setting information X1 to the setting information Y1. Accordingly, the setting information 702-1 acquired in the dummy RD starting at T1313 by the parallel processing module 503-1 is the setting information Y1.

In the table WR starting at T1317, the parallel processing module 503-1 holds a computation result D1 as the previous computation result 1302-1. After T1319 when the table updating for the third packet ends, the computation result 802-1 holds the computation result D1.

In the foregoing processing, the previous computation result 1302-1 after T1314 holds the computation result B1; accordingly, the parallel processing module 503-1 can pass over the computation result B1 to the data computation in the table updating for the second packet. Since the previous computation result 1302-1 after T1315 holds the computation result C1, the parallel processing module 503-1 can pass over the computation result C1 to the data computation in table updating for the third packet.

FIG. 13B is an explanatory diagram illustrating computation results in the case where two parallel processing modules 503 in Embodiment 1 perform the table updating S1150.

FIG. 13B is an explanatory diagram illustrating transitions of the computation result in the case where two parallel processing modules 503-1 and 503-2 perform the table updating S1150. When the parallel processing assignment module 501 receives incoming packets of different flows, the computation results shown in FIG. 13B are obtained.

In FIG. 13B, the parallel processing assignment module 501 consecutively receives a first packet of the flow ID "100", a second packet of the flow ID "200", and a third packet of the flow ID "100". The setting information 702 of the entry in the setting table 213 containing "200" in the flow ID 701 is referred to as setting information 702-2. The computation result 802 of the entry in the computation table 214 containing "200" in the flow ID 801 is referred to as a computation result 802-2. The previous computation result 1302-2 is the previous computation result held by the parallel processing module 503-2.

The parallel processing module 503-1 performs table updating for the first packet in FIG. 13B in the same way as the table updating for the first packet in FIG. 13A.

The second packet in FIG. 13B has a flow ID different from that of the first packet. Accordingly, the parallel processing assignment module 501 sends a notice of assignment including a new/successive parameter indicating "new", the flow ID "200", the flow length of the second packet, and a processing start trigger to the parallel processing module 503-2.

The parallel processing module 503-2 performs table updating for the second packet like the table updating for the first packet by the parallel processing module 503-1. The parallel processing module 503-2 starts the table updating for the second packet at T1312 and ends the table updating for the second packet by T1318.

At T1312, the parallel processing module 503-2 acquires setting information 702-2 (setting information X2) from the setting table 213. The parallel processing module 503-2 further acquires a computation result 802-2 (computation result A2) from the computation table 214 at T1312. The parallel processing module 503-2 updates the computation result A2 with a computation result B2 in the table updating for the second packet.

While the parallel processing module 503-1 is writing back the computation result B1 to the computation table 214, the parallel processing module 503-2 writes back the computation result B2 to the computation table 214 (T1315). This is because the flow IDs are different between the first packet and the second packet and the information on the first packet and the information on the second packet are held in different entries in both of the setting table 213 and the computation table 214. Both of the parallel processing modules 503-1 and 503-2 can simultaneously write back computation results to the computation table 214.

The third packet has the same flow ID as the first packet and is received by the parallel processing assignment module 501 before completion of the table updating for the first packet. The parallel processing assignment module 501 determines that the parallel processing module 503-1 which performs the table updating for the first packet is to successively perform the table updating for the third packet.

The table updating for the third packet by the parallel processing module 503-1 is the same as the table updating for the third packet illustrated in FIG. 13A. However, the parallel processing module 503-1 acquires the computation result B1 from the previous computation result 1302-1 and updates the computation result B1 with a computation result C1.

Since the shortest packet arrival intervals in this embodiment are all 2 clks, data computation in successive packet processing by parallel processing modules should be completed within 2 clks. The parallel processing assignment module 501 in this embodiment keeps a time length required for data computation and if it receives an incoming packet at a time interval shorter than the time length required for the data computation, it may discard the subsequently received incoming packet.

According to Embodiment 1 described above, the packet communication apparatus 2 performs data computation for consecutively arriving incoming packets using previous computation results held by the parallel processing modules 503. Hence, the parallel processing modules 503 in Embodiment 1 do not need to access the computation table 214 at every table updating and can perform table updating successively.

Furthermore, the less access to the computation table 214 can save the power consumption in the packet communication apparatus.

Embodiment 1 allows more complex table updating because table updating for incoming packets utilizes the setting table 213 and conversion of the incoming packets is performed at the output determination module 504.

Embodiment 2

Hereinafter, Embodiment 2 is described with reference to FIGS. 14 to 20.

Although the packet communication apparatus 2 in Embodiment 1 performs general table updating for incoming packets, the packet communication apparatus in Embodiment 2 performs bandwidth control based on incoming packets. To perform the bandwidth control function, the packet communication apparatus in Embodiment 2 employs a token bucket algorithm.

In using the token bucket algorithm, the packet communication apparatus adds tokens to a token bucket (a predetermined area provided in a memory) at a rate corresponding to the allocated bandwidth. If the token bucket holds accumulated tokens corresponding to the frame length of a packet to be sent, the packet communication apparatus determines that the packet is under guarantee of bandwidth; then the packet communication apparatus sends the packet having the frame length and removes the tokens corresponding to the frame length from the token bucket. If the token bucket does not hold enough tokens corresponding to the frame length of a packet to be sent, the packet communication apparatus determines that the packet is out of guarantee of bandwidth and sends the packet having the frame length. The apparatus keeps the tokens and does not remove the tokens corresponding to the frame length from the token bucket.

FIG. 14 is a block diagram illustrating a physical configuration of the packet communication apparatus 22 in Embodiment 2 and a logic device 2210 in the apparatus 22.

The packet communication apparatus 22 in Embodiment 2 has the same physical configuration as that of the packet communication apparatus 2 in Embodiment 1 shown in FIG. 2. Specifically, the packet communication apparatus 22 includes a plurality of network interface boards (NIFs) 200-1 to 200-M and a switch unit 206 like the packet communication apparatus 2 shown in FIG. 2. Each NIF 200 in Embodiment 2 also includes an input/output communication interface 201, a SW interface 205, and an NIF manager 211 like the NIF 200 in Embodiment 1.

However, the NIF 200 in Embodiment 2 includes a logic device 2210 instead of the logic device 210 in Embodiment 1. The difference between the logic device 2210 and the logic device 210 is that the memory in the logic device 2210 holds a bandwidth setting table 2213 and a computation result storage table 2214.

The incoming packet controller 2203 in the logic device 2210 performs processing differently from the incoming packet controller 203 in the logic device 210 in Embodiment 1.

The setting register 2212 in the logic device 2210 has a storage area for transitorily storing data and is connected with all the processing modules in the logic device 2210, like the setting register 212 in Embodiment 1. However, the setting register 2212 stores data different from the data stored by the setting register 212 because of the processing of the incoming packet controller 2203. The following description omits explanation of the processing of the setting register 2212.

The incoming header processing module 202, the incoming packet buffer 204, the outgoing header processing module 207, the outgoing packet controller 208, and the outgoing packet buffer 209 in Embodiment 2 are the same as the incoming header processing module 202, the incoming packet buffer 204, the outgoing header processing module 207, the outgoing packet controller 208, and the outgoing packet buffer 209 in Embodiment 1.

The bandwidth setting table 2213 corresponds to the setting table 213 in Embodiment 1 and stores setting values to be used in table updating performed in the incoming packet controller 2203. The computation result storage table 2214 corresponds to the computation table 214 in Embodiment 1 and stores the results of table updating performed in the incoming packet controller 2203. Embodiment 2 is an embodiment in the case where the data stored in the setting table 213 and the computation table 214 is different from that in Embodiment 1.

When the incoming packet controller 2203 receives an incoming packet from the incoming header processing module 202, it stores the incoming packet in the incoming packet buffer 204. At this time, the incoming packet controller 2203 processes the packet, namely performs bandwidth control, using the bandwidth setting table 2213 and the computation result storage table 2214. After the bandwidth control, the incoming packet controller 2203 retrieves the packet stored in the incoming packet buffer 204 to send it to the SW interface 205.

Figure 15:
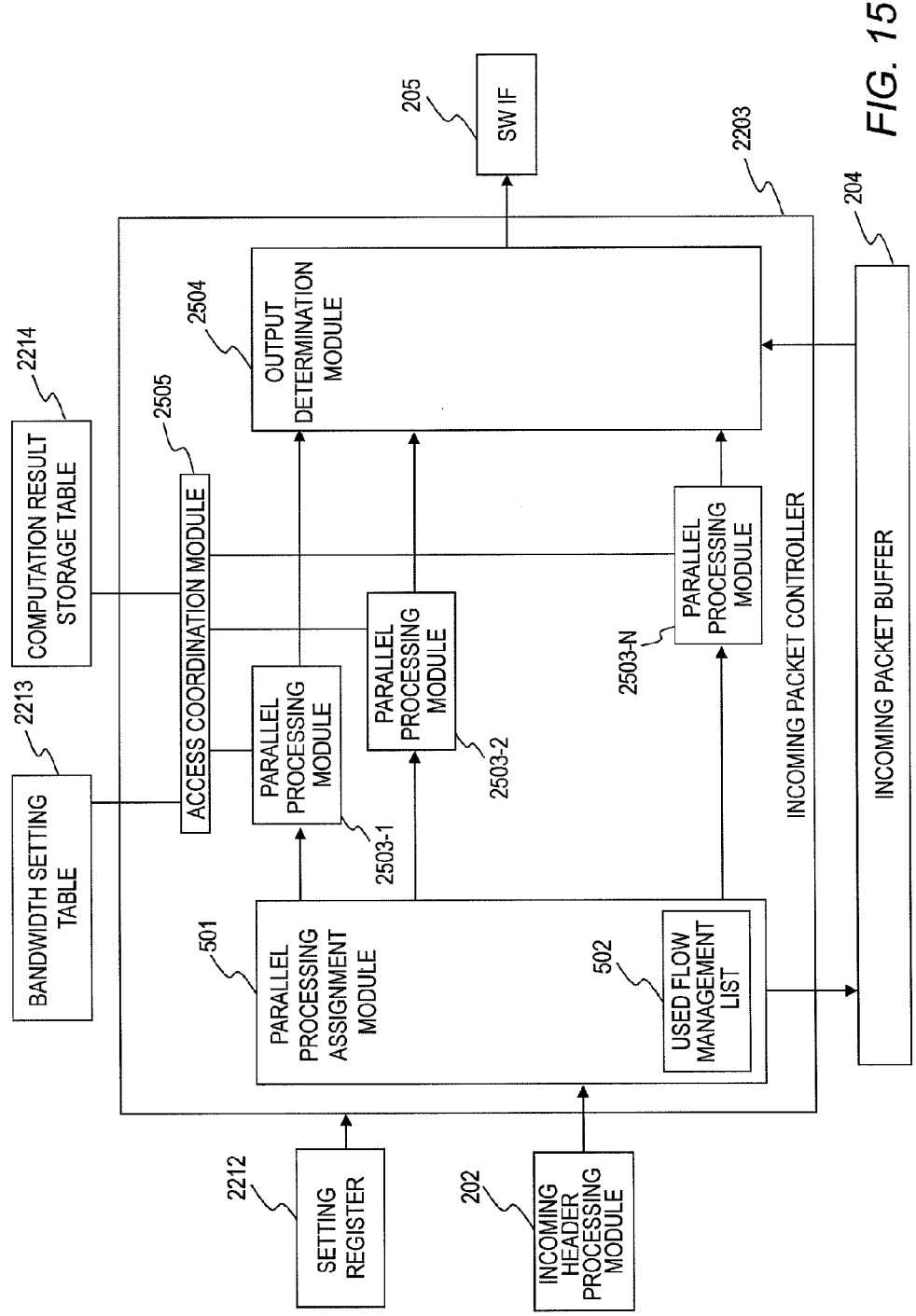
FIG. 15 is a block diagram illustrating a logical configuration of an incoming packet controller in Embodiment 2.

FIG. 15 is a block diagram illustrating a logical configuration of the incoming packet controller 2203 in Embodiment 2.

The incoming packet controller 2203 has the same configuration as that of the incoming packet controller 203 shown in FIG. 5. The difference between the incoming packet controller 2203 and the incoming packet controller 203 in Embodiment 1 is that the incoming packet controller 2203 includes a plurality of parallel processing modules 2503 (parallel processing modules 2503-1 to 2503-N), an output determination module 2504, and an access coordination module 2505. The parallel processing modules 2503, output determination module 2504, and access coordination module 2505 perform processing differently from the parallel processing modules 503, output determination module 504, and access coordination module 505.

The used flow management list 502 in Embodiment 2 is also different from the used flow management list 502 in Embodiment 1 in the point that the parallel processing modules 601 in the used flow management list 502 represent the parallel processing modules 2503-1 to 2503-N.

The parallel processing assignment module 501 in Embodiment 2 performs the same processing assignment S950 that the parallel processing assignment module 501 in Embodiment 1 does.

Each parallel processing module 2503 performs later-described table updating S1850 and updates information on a flow included in the computation result storage table 2214.

The parallel processing module 2503 sends a determination of processing ("under guarantee" or "out of guarantee") to the output determination module 2504.

Like in Embodiment 1, the time required for table updating S1850 by the parallel processing module 2503 is predetermined in Embodiment 2. Furthermore, the incoming packet buffer 204 is used as a shift register by the parallel processing assignment module 501 and the output determination module 2504. Still like in Embodiment 1, the number N of the parallel processing modules 2503 is predetermined based on the table update time length and the shortest packet arrival interval.

The output determination module 2504 performs later-described output determination S1950 and receives a notice of completion of computation and a determination of processing ("under guarantee" or "out of guarantee") from each parallel processing module 2503. The output determination module 2504 converts the header of an incoming packet received from the incoming packet buffer 204 and sends the incoming packet with the converted header to the SW interface 205.

The access coordination module 2505 coordinates the accesses (retrievals and write-backs) from the parallel processing modules 2503 to the bandwidth setting table 2213 and the computation result storage table 2214, like the access coordination module 505 in Embodiment 1.

FIG. 16 is an explanatory diagram illustrating the bandwidth setting table 2213 in Embodiment 2.

The values stored in the bandwidth setting table 2213 are setting values for the parallel processing module 2503 to execute the token algorithm; they are predetermined, for example, by the administrator. The bandwidth setting table 2213 includes columns of flow IDs 2701, periodically added token values 2702, and depths of token buckets 2703.

The column of flow IDs 2701 includes identifiers uniquely representing the flows assigned to incoming packets. The values stored in the flow IDs 2701 correspond to the values in the flow IDs 302 of in-apparatus headers 3 stored by the incoming header processing module 202.

Each periodically added token value 2702 indicates the amount of token to be added to a token bucket per unit time (corresponding to the guaranteed bandwidth reserved per unit time).

Each depth of token bucket 2703 indicates a maximum amount of token the token bucket can contain.

FIG. 17 is an explanatory diagram illustrating the computation result storage table 2214 in Embodiment 2.

The computation result storage table 2214 is a table used to determine whether the packet can be sent in a guaranteed bandwidth. The computation result storage table 2214 includes columns of flow IDs 2801, previous packet arrival times 2802, and stored token values 2803.

A flow ID 2801 includes a flow ID uniquely representing a flow assigned to each incoming packet. The value stored in the flow ID 2801 corresponds to the value in the flow ID 302 of an in-apparatus header 3 stored by the incoming header processing module 202.

A previous packet arrival time 2802 indicates the time of execution of previous table updating by a parallel processing module 2503. A stored token value 2803 indicates the amount of token accumulated in the token bucket that was calculated in the previous table updating. That is to say, the previous packet arrival time 2802 indicates the time of calculation of the value stored in the stored token value 2803.

Figure 18A:
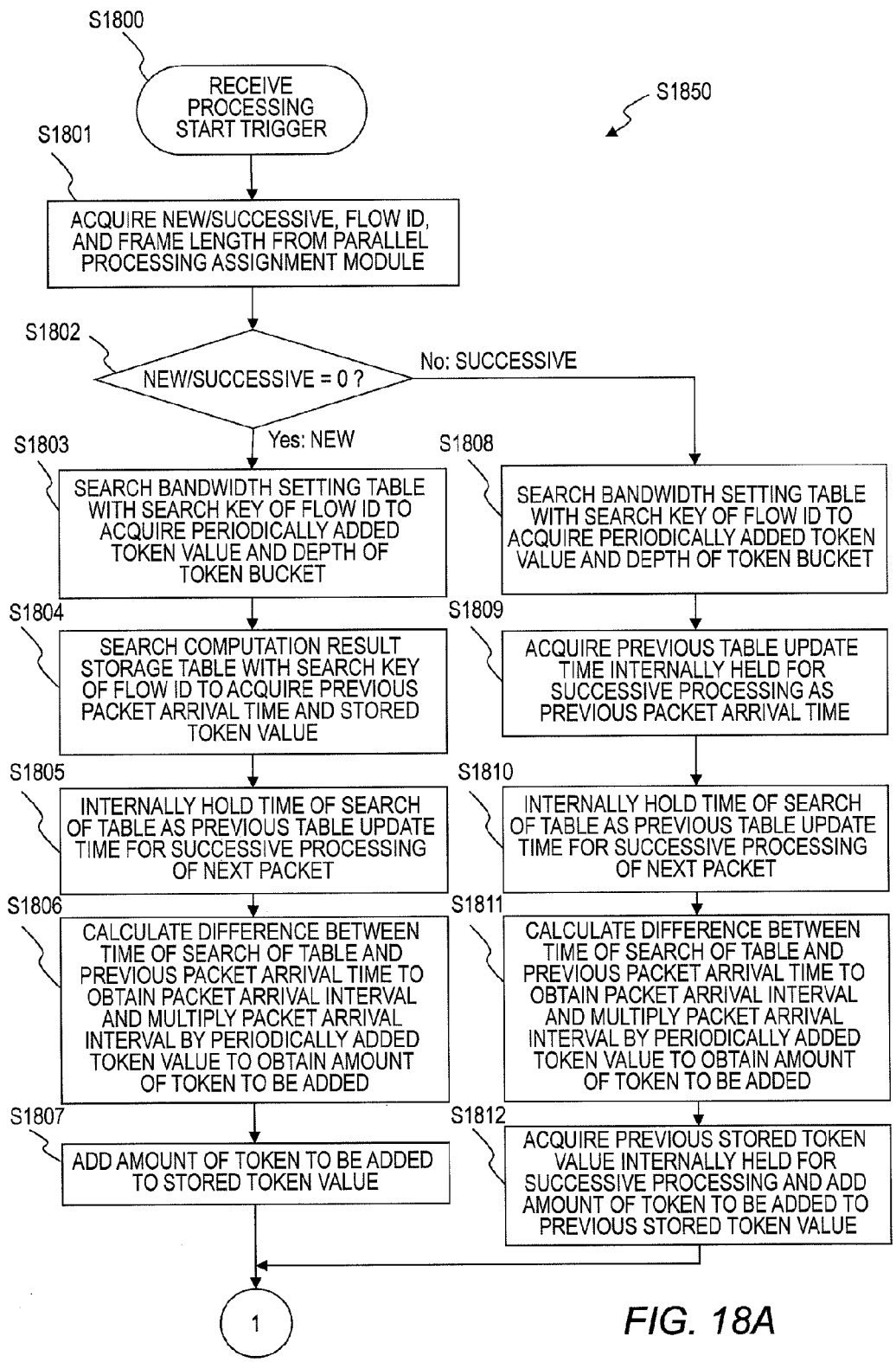
FIG. 18A is a flowchart illustrating calculation of the amount of token accumulated before receipt of an incoming packet in table updating performed by a parallel processing module in Embodiment 2.
Figure 18B:
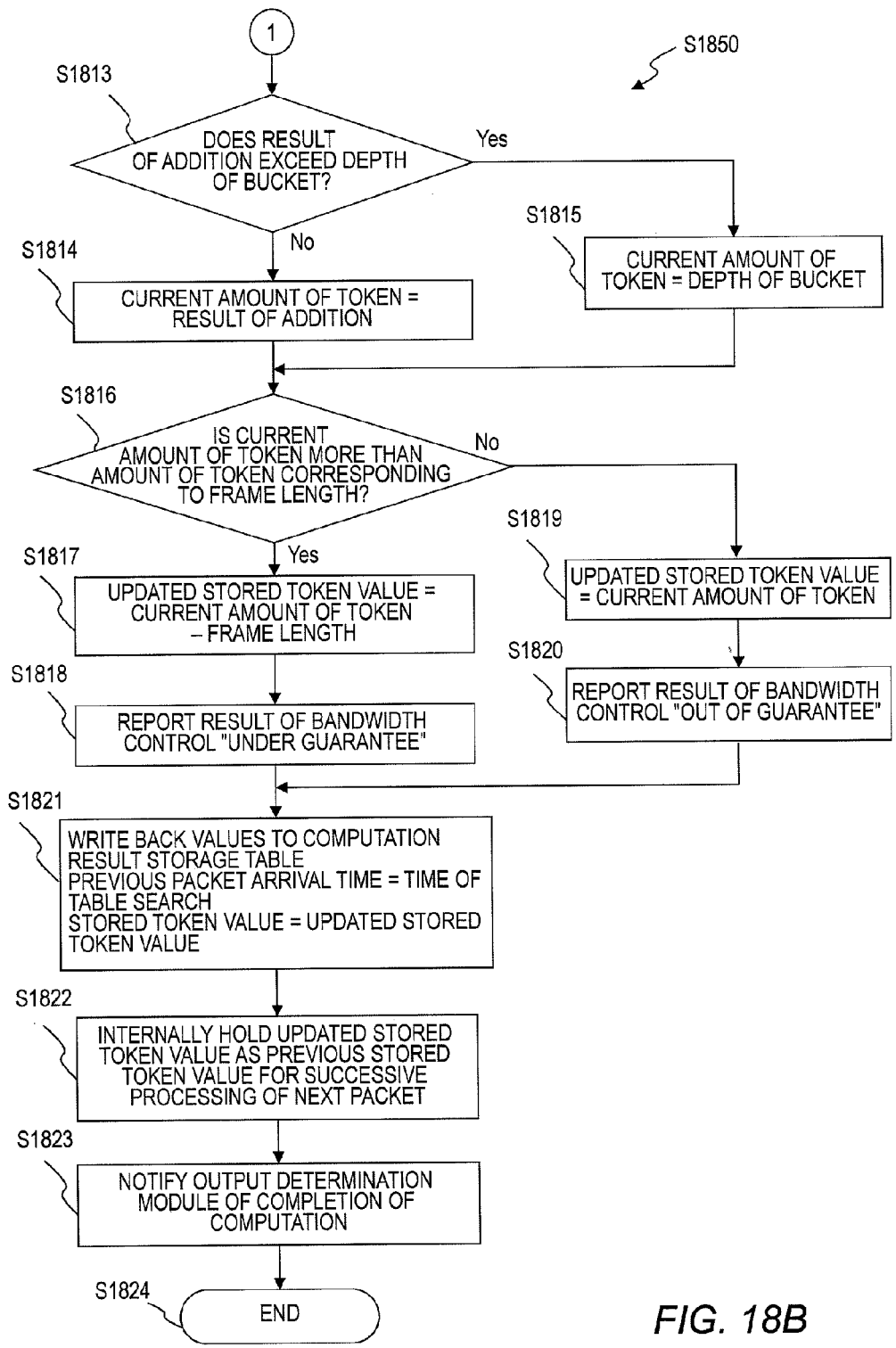
FIG. 18B is a flowchart illustrating determination whether the incoming packet is under guarantee in the table updating performed by a parallel processing module in Embodiment 2.

With reference to FIGS. 18A and 18B, described is table updating S1850 performed by the parallel processing module 2503.

FIG. 18A is a flowchart illustrating calculation of the amount of token accumulated before receiving an incoming packet in the table updating S1850 performed by the parallel processing module 2503 in Embodiment 2.

Upon receipt of a notice of assignment including a processing start trigger from the parallel processing assignment module 501 (S1800), the parallel processing module 2503 acquires the new/successive parameter, the flow ID, and the frame length included in the notice of assignment (S1801).

After S1801, the parallel processing module 2503 determines whether the new/successive parameter is "0", namely, whether the new/successive parameter indicates "new" (S1802).

If the new/successive parameter is "0", meaning if it is determined that the new/successive parameter indicates "new" at S1802, the parallel processing module 2503 searches the bandwidth setting table 2213 with a search key of the flow ID acquired at S1801, namely, the flow ID of the incoming packet. As a result of the search, the parallel processing module 2503 acquires the value of the periodically added token value 2702 and the depth of token bucket 2703 of the entry in the bandwidth setting table 2213 containing the flow ID of the incoming packet in the flow ID 2701 (S1803).

In this connection, the parallel processing module 2503 holds the time of the search of the bandwidth setting table 2213 at S1803 in the memory of the logic device 2210.

After S1803, the parallel processing module 2503 searches the computation result storage table 2214 with a search key of the flow ID of the incoming packet. As a result of the search, the parallel processing module 2503 acquires the values of the previous packet arrival time 2802 and the stored token value 2803 of the entry in the computation result storage table 2214 containing the flow ID of the incoming packet in the flow ID 2801 (S1804).

After S1804, the parallel processing module 2503 internally holds the time of the search of the bandwidth setting table 2213 at S1803 as a previous table update time for successive processing of the next incoming packet (S1805).

After S1805, the parallel processing module 2503 calculates the difference between the time of the search of the bandwidth setting table 2213 internally held at S1803 and the previous packet arrival time 2802 acquired at S1804 to obtain a packet arrival interval. The parallel processing module 2503 multiplies the obtained packet arrival interval by the periodically added token value 2702 acquired at S1803 to obtain the amount of token to be added (S1806).

After S1806, the parallel processing module 2503 adds the amount of token to be added obtained at S1806 to the stored token value 2803 acquired at S1804 (S1807). After S1807, the parallel processing module 2503 proceeds to S1813 shown in FIG. 18B.

If, at S1802, the new/successive parameter is not "0", meaning if it is determined that the new/successive parameter indicates "successive", the parallel processing module 2503 performs the same processing as S1803 (S1808). Through S1808, the parallel processing module 2503 acquires the values of the periodically added token value 2702 and the depth of token bucket 2703 for the incoming packet.

Furthermore, the parallel processing module 2503 holds the time of the search of the bandwidth setting table 2213 at S1808 in the memory of the logic device 2210.

After S1808, the parallel processing module 2503 acquires the previous table update time internally held for successive processing as the previous packet arrival time (S1809).

After S1809, the parallel processing module 2503 performs the same processing as S1805 (S1810). Specifically, at S1810, the parallel processing module 2503 internally holds the time of the search of the bandwidth setting table 2213 at S1808 as a previous table update time for successive processing of the next incoming packet.

After S1810, the parallel processing module 2503 calculates the difference between the previous packet arrival time acquired at S1809 and the time of the search of the bandwidth setting table 2213 held at S1808 to obtain a packet arrival interval. The parallel processing module 2503 multiplies the obtained packet arrival interval by the periodically added token value 2702 acquired at S1808 to obtain the amount of token to be added (S1811).

After S1811, the parallel processing module 2503 acquires the previous stored token value internally held for successive processing and adds the amount of token to be added obtained at S1811 to the acquired previous stored token value (S1812) and proceeds to S1813. The previous stored token value acquired at S1812 is the value held at S1822 in FIG. 18B.

The result of addition at S1807 or S1812 is the amount of token accumulated in the token bucket before the receipt of the incoming packet.

In addition to the processing of S1802 to S1812, the parallel processing module 2503 in Embodiment 2 may perform processing differently depending on the value of the new/successive parameter. For example, if the new/successive parameter indicates "new", the parallel processing module 2503 may add a value predetermined by the user to the value of the result of the addition at S1807.

This approach allows the computation result to be updated with a value different depending on whether incoming packets arrive successively or not, as requested by the user.

FIG. 18B is a flowchart illustrating determination whether an incoming packet is under guarantee of bandwidth in the table updating S1850 performed by the parallel processing module 2503 in Embodiment 2.

After S1807 or S1812, the parallel processing module 2503 determines whether the result of the addition at S1807 or S1812 exceeds the value of the depth of token bucket 2703 acquired at S1803 or S1808 (S1813).

If it is determined at S1813 that the result of the addition at S1807 or S1812 is equal to or smaller than the value of the depth of token bucket 2703, the parallel processing module 2503 holds the result of the addition at S1807 or S1812 as the current amount of token (S1814). After S1814, the parallel processing module 2503 proceeds to S1816.

Alternatively, if it is determined at S1813 that the result of the addition at S1807 or S1812 exceeds the value of the depth of token bucket 2703, the parallel processing module 2503 holds the value of the depth of token bucket 2703 as the current amount of token (S1815). After S1815, the parallel processing module 2503 proceeds to S1816.

After S1814 or S1815, the parallel processing module 2503 determines whether the amount of token corresponding to the frame length of the incoming packet acquired at S1801 is equal to or less the current amount of token stored at S1814 or S1815 (S1816).

If it is determined at S1816 that the amount of token corresponding to the frame length of the incoming packet acquired at S1801 is equal to or less than the current amount of token, the parallel processing module 2503 calculates a token value after removing the amount of token corresponding to the frame length of the incoming packet from the current amount of token to obtain an updated stored token value (S1817). The updated stored token value indicates the amount of token left in the token bucket after sending the incoming packet.

After S1817, the parallel processing module 2503 creates a determination of processing indicating that the result of bandwidth control is "under guarantee" and sends the created determination of processing to the output determination module 2504 (S1818). After S1818, the parallel processing module 2503 proceeds to S1821.

If it is determined at S1816 that the amount of token corresponding to the frame length of the incoming packet acquired at S1801 exceeds the current amount of token, the parallel processing module 2503 holds the same value as the current amount of token as the updated stored token value (S1819).

After S1819, the parallel processing module 2503 creates a notice indicating that the result of bandwidth control is "out of guarantee" and sends the created notice to the output determination module 2504 (S1820). After S1820, the parallel processing module 2503 proceeds to S1821.

It should be noted that the parallel processing module 2503 may create a determination of processing indicating that the result of bandwidth control is "under guarantee" or "out of guarantee" at S1818 or S1820 and sends the created determination of processing and a notice indicating the completion of computation to the output determination module 504 at later-described S1823.

By sending or creating the result of bandwidth control at S1818 or S1820, the parallel processing module 2503 can make the incoming packet processed in accordance with the result of the bandwidth control.

After S1818 or S1820, the parallel processing module 2503 updates the previous packet arrival time 2802 in the computation result storage table 2214 with the time of search of the bandwidth setting table 2213 held at S1803 or S1808. The parallel processing module 2503 writes back the updated stored token value to the stored token value 2803 in the computation result storage table 2214 (S1821).

After S1821, the parallel processing module 2503 internally holds the updated stored token value as a previous stored token value for successive processing of the next incoming packet (S1822).

After S1822, the parallel processing module 2503 creates a notice including the flow ID of the incoming packet and indicating completion of computation and sends the created notice to the output determination module 2504 (S1823). After S1823, it terminates the processing illustrated in FIGS. 18A and 18B (S1824).

Described hereinafter is output determination S1950 performed by the output determination module 2504.

Figure 19:
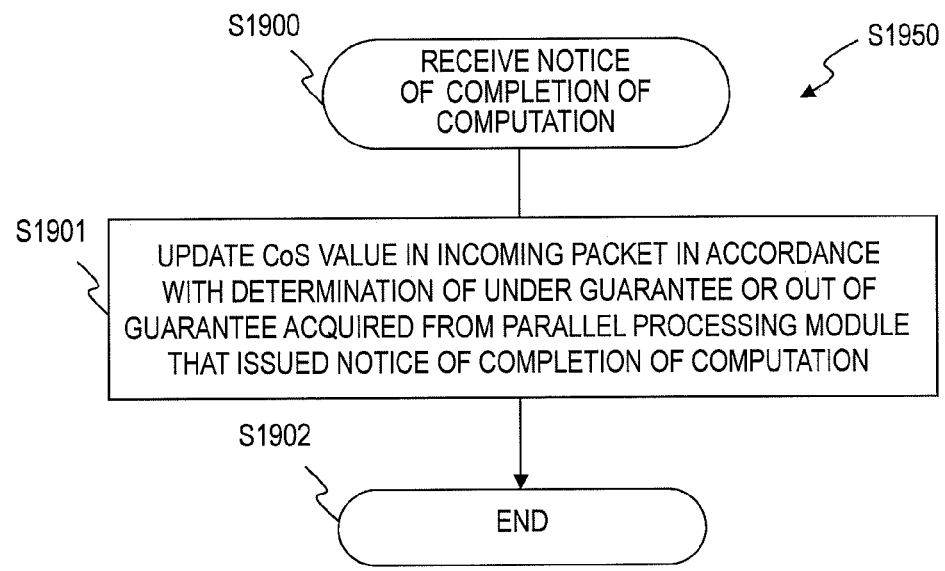
FIG. 19 is a flowchart illustrating output determination performed by an output determination module in Embodiment 2.

FIG. 19 is a flowchart illustrating the output determination S1950 performed by the output determination module 2504 in Embodiment 2.

Upon receipt of a notice indicating completion of computation from the parallel processing module 2503 (S1900), the output determination module 2504 retrieves the incoming packet indicated by the received notice. Then, the output determination module 2504 identifies the determination of processing (under guarantee or out of guarantee) sent by the parallel processing module 2503, which is the same parallel processing module 2503 that has sent the notice indicating the completion of computation.

The output determination module 2504 updates a CoS value and other values included in the retrieved incoming packet in accordance with the determination of processing identified by the notice (S1901). The output determination module 2504 sends the incoming packet with the updated CoS value and other values to the SW interface 205.

After S1901, the output determination module 2504 terminates the output determination S1950 (S1902).

Figure 20:
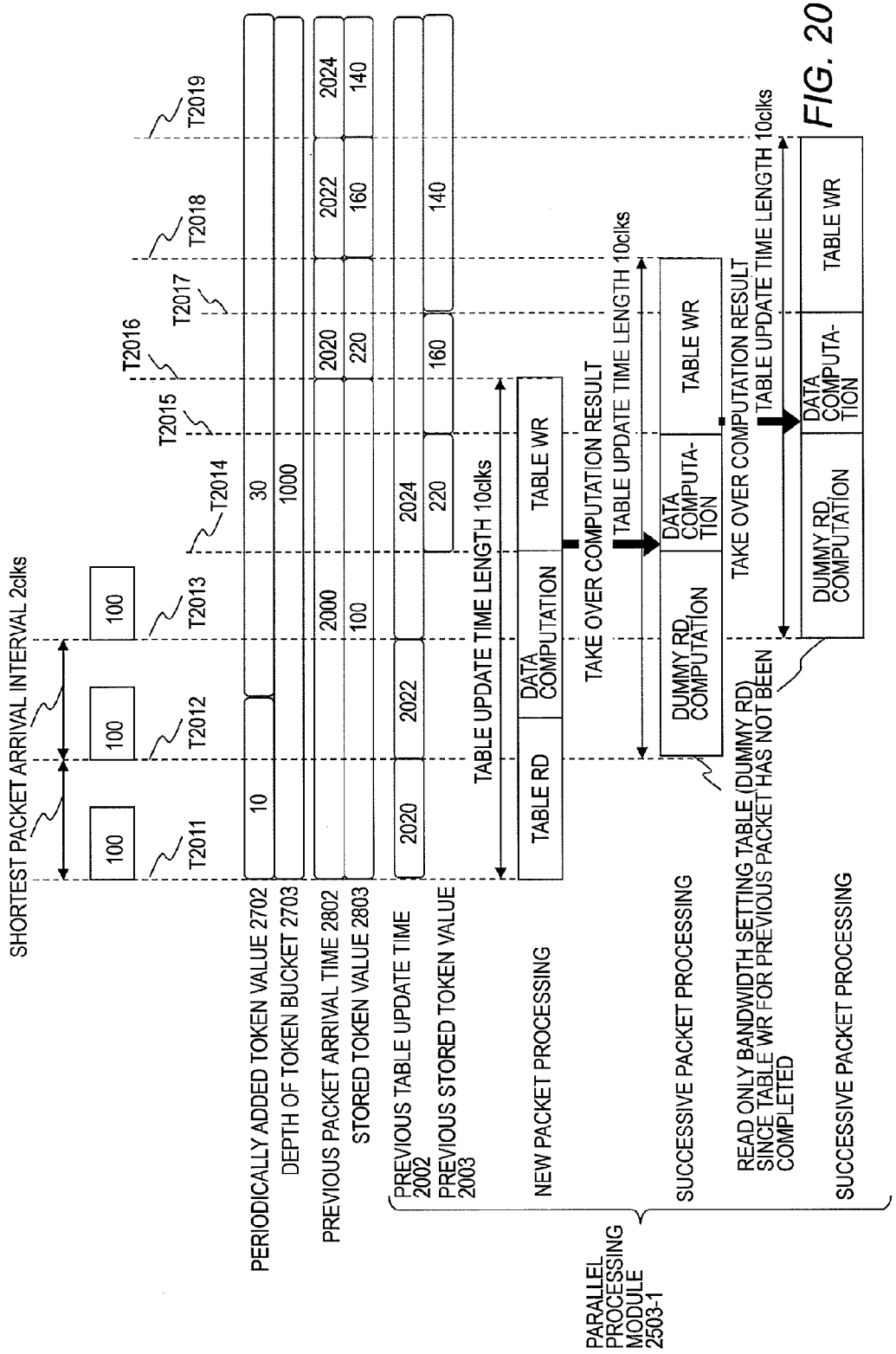
FIG. 20 is an explanatory diagram illustrating transitions of the previous packet arrival time and the stored token value caused by the table updating in Embodiment 2.

FIG. 20 is an explanatory diagram illustrating transitions of the previous packet arrival time and the stored token value caused by the table updating S1850 in Embodiment 2.

Assuming that the table update time length is 10 clks and the shortest packet arrival interval is 2 clks, FIG. 20 illustrates an example that the parallel processing module 2503-1 successively receives incoming packets of the same flow ID "100". In FIG. 20, the frame lengths of the first packet, the second packet, and the third packet are 80.

Like the first packet in Embodiment 1, the first packet in Embodiment 2 is an incoming packet on which the parallel processing assignment module 501 has determined at S904 that the parallel processing module 2503-1 is to newly perform table updating.

When the parallel processing module 2503-1 in Embodiment 2 receives a notice of assignment including a new/successive parameter indicating "new", the flow ID of the first packet, and a processing start trigger from the parallel processing assignment module 501 (T2011), the parallel processing module 2503-1 starts searching the bandwidth setting table 2213 and the computation result storage table 2214 with a search key of the flow ID "100" of the first packet. As a result of the search, the parallel processing module 2503-1 acquires a periodically added token value, a depth of token bucket, a previous packet arrival time, and a stored token value (table RD).

The table RD for the first packet corresponds to S1800 to S1805 in FIG. 18A.

Meanwhile, in the table RD for the first packet, the parallel processing module 2503-1 internally holds the time of the search of the bandwidth setting table 2213 as a previous table update time 2002 for successive processing of the next incoming packet. This corresponds to S1805. In the table RD for the first packet shown in FIG. 20, the time of the search of the bandwidth setting table 2213 is "2020".

As a result of the search of the bandwidth setting table 2213 and the computation result storage table 2214 in the table RD for the first packet shown in FIG. 20, the parallel processing module 2503-1 acquires a value "10" for the periodically added token value 2702, a value "1000" for the depth of token bucket 2703, a value "2000" for the previous packet arrival time 2802, and a value "100" for the stored token value 2803. The value of the previous table update time 2002 internally held by the parallel processing module 2503-1 in the table RD for the first packet is "2020".

After the table RD for the first packet, the parallel processing module 2503-1 calculates the stored token value 2803 using the value "2020" of the time of search of the bandwidth setting table 2213, the value "10" of the periodically added token value 2702, the value "1000" of the depth of token bucket 2703, the value "2000" of the previous packet arrival time 2802, and the value "100" of the stored token value 2803 to obtain a value "220" (data computation). Here, the stored token value is obtained by calculating {(2020−2000)×10+ 100−80=220}.

Meanwhile, in the data computation for the first packet, the parallel processing module 2503 acquires the time of search of the bandwidth setting table 2213 as the previous packet arrival time. That is to say, the previous packet arrival time acquired in data computation and the previous table update time 2002 in table RD are the same value.

The foregoing data computation for the first packet corresponds to S1806, S1807, S1813, S1814, and S1816 to S1818 in FIGS. 18A and 18B.

When the data computation for the first packet is completed (T2014), the parallel processing module 2503-1 starts writing back the acquired value "2020" of the previous packet arrival time and the calculated value "220" of the stored token value to the previous packet arrival time 2802 and the stored token value 2803 in the computation result storage table 2214 (table WR). The table WR for the first packet corresponds to S1821 in FIG. 18B.

Since updating the computation result storage table 2214 requires a certain time, the acquired value "2020" of the previous packet arrival time 2802 and the calculated value "220" of the stored token value 2803 are reflected to the computation result storage table 2214 at T2016.

Meanwhile, in the table WR for the first packet, the parallel processing module 2503-1 internally holds the calculated value "220" of the stored token value as a previous stored token value 2003 for successive processing of the next incoming packet. This corresponds to S1822 in FIG. 18.

The second packet is received by the parallel processing assignment module 501 before completion of the table updating for the first packet. Accordingly, the second packet is an incoming packet on which the parallel processing assignment module 501 has determined at S904 that the parallel processing module 2503-1 is to successively perform table updating.

When the parallel processing module 2503-1 receives a notice of assignment including a new/successive parameter indicating "successive", the flow ID of the second packet, and a processing start trigger from the parallel processing assignment module 501 (T2012), the parallel processing module 2503-1 starts searching the bandwidth setting table 2213 with a search key of the flow ID of the second packet.

As a result of the search, the parallel processing module 2503-1 acquires a value "10" for the periodically added token value 2702 and a value "1000" for the depth of token bucket 2703 (dummy RD). This dummy RD for the second packet corresponds to S1800 to S1802, and S1808.

Since the second packet is received before completion of the table updating for the first packet, the parallel processing module 2503-1 does not access the computation result storage table 2214 in the dummy RD for the second packet. The dummy RD in Embodiment 2 only refers to the bandwidth setting table 2213 and does not acquire values from the computation result storage table 2214.

Meanwhile, in the dummy RD for the second packet, the parallel processing module 2503-1 acquires the value "2020" of the previous update time 2002 internally held in the table updating for the first packet as the previous packet arrival time. This corresponds to S1809.

Furthermore, in the dummy RD for the second packet, the parallel processing module 2503-1 internally holds the value "2022" of the time of the foregoing search of the bandwidth setting table 2213 as a previous table update time 2002 for successive processing of the next incoming packet. This corresponds to S1810.

In the dummy RD for the second packet, the parallel processing module 2503-1 calculates the amount of token to be added using the value "2022" of the time of search of the bandwidth setting table 2213, the value "10" of the periodically added token value 2702, and the value "2020" of the previous packet arrival time 2802 (data computation) before passing over the previous stored token value, which will be described below. The data computation for the second packet corresponds to S1811 in FIG. 18A. Here, the amount of token to be added is obtained by (2022−2020)×10=20.

The parallel processing module 2503-1 takes over the value "220" of the previous stored token value 2003 internally held in the table updating for the first packet to the table updating for the second packet in the data computation for the second packet. This corresponds to S1812 in FIG. 18A.

Then, in the data computation for the second packet, the parallel processing module 2503-1 calculates the updated previous table update time and the updated stored token value. This corresponds to S1812 in FIG. 18A, S1813, S1814, and S1816 to S1818 in FIG. 18B. The updated stored token value calculated in this processing is obtained by 20+220−80=160.

When the data computation for the second packet is completed at T2015, the parallel processing module 2503-1 starts writing back the acquired previous packet arrival time "2022" and the calculated stored token value "160" to the computation result storage table 2214 (table WR). This corresponds to S1821 in FIG. 18B.

Since updating the computation result storage table 2214 requires a certain time, the acquired previous packet arrival time "2022" and the calculated stored token value "160" are reflected to the computation result storage table 2214 at T2018.

Meanwhile, in the table WR for the second packet, the parallel processing module 2503-1 internally holds the calculated stored token value "160" as a previous stored token value 2003 for successive processing of the next incoming packet. This corresponds to S1822 in FIG. 18B.

Just as the second packet is a packet received before the completion of the table updating for the first packet, the third packet is a packet received by the parallel processing assignment module 501 before completion of the table updating for the second packet. For this reason, the table updating for the third packet is the same as the table updating for the second packet.

However, the periodically added token value 2702 in FIG. 20 is updated by the administrator between T2012 and T2013 when the table updating for the third packet is started. Specifically, the value stored in the periodically added token value 2702 is updated from "10" to "30". Accordingly, the value acquired for the periodically added token value 2702 by the parallel processing module 2503-1 in the dummy RD starting at T2013 is "30".

In the table WR starting at T2017, the parallel processing module 2503-1 holds "140"{=(2024−2022)×30+160−80} for the previous stored token value 2003. After T2019 when the table updating for the third packet ends, the computation result storage table 2214 holds "2024" for the previous packet arrival time 2802 and "140" for the stored token value 2803.

In the foregoing processing, the parallel processing module 2503-1 after T2014 holds the previous table update time 2002 and the previous stored token value 2003 obtained by the table updating for the first packet; accordingly, the parallel processing module 2503-1 can take over the previous table update time 2002 and the previous stored token value 2003 in the data computation in the table updating for the second packet. The parallel processing module 2503-1 after T2015 holds the previous table update time 2002 and the previous stored token value 2003 obtained by the table updating for the second packet; accordingly, the parallel processing module 2503-1 can take over the previous table update time 2002 and the previous stored token value 2003 in the data computation in the table updating for the third packet.

According to Embodiment 2 described above, like the effect of the Embodiment 1, the parallel processing module 503 in Embodiment 2 does not need to access the computation result storage table 2214 at every table updating and can successively perform table updating for the bandwidth control function.

Furthermore, the less access to the computation result storage table 2214 can save the power consumption in the packet communication apparatus.

Embodiment 2 provides more reliable bandwidth control since table updating utilizing the token bucket algorithm enables the output determination module 504 to convert incoming packets in accordance with the result of the table updating.

Embodiment 3

Hereinafter, Embodiment 3 is described with reference to FIGS. 21 to 25.

In Embodiment 3, this invention is applied to a statistical counting function. In Embodiment 3, the statistical counting function counts received packets and received bytes for statistical information.

Figure 21:
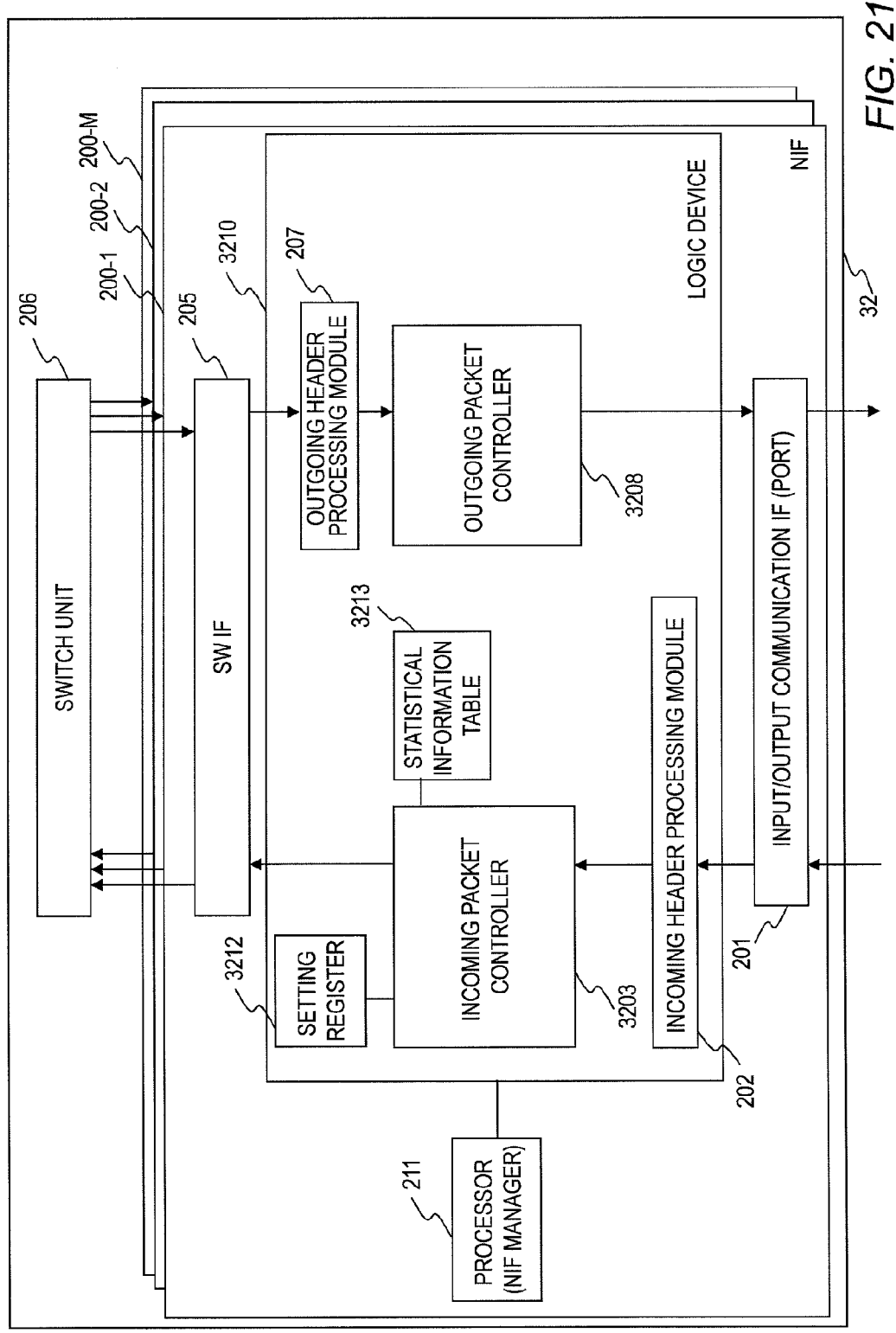
FIG. 21 is a block diagram illustrating a physical configuration of a packet communication apparatus in Embodiment 3 and a logic device in the packet communication apparatus.

FIG. 21 is a block diagram illustrating a physical configuration of the packet communication apparatus 32 in Embodiment 3 and a logic device 3210 in the apparatus 32.

The packet communication apparatus 32 in Embodiment 3 has the same physical configuration as that of the packet communication apparatus 2 in Embodiment 1 shown in FIG. 2. Specifically, the packet communication apparatus 32 includes a plurality of network interface boards (NIFs) 200 (200-1 to 200-M) and a switch unit 206 like the packet communication apparatus 2 shown in FIG. 2. Each NIF 200 in Embodiment 3 also includes an input/output communication interface 201, a SW interface 205, and an NIF manager 211 like the NIF 200 in Embodiment 1.

However, the NIF 200 in Embodiment 3 includes a logic device 3210 instead of the logic device 210 in Embodiment 1. The difference between the logic device 3210 and the logic device 210 is that the memory in the logic device 3210 does not hold the setting table 213, the incoming packet buffer 204, and the outgoing packet buffer 209 but holds a statistical information table 3213.

The incoming packet controller 3203 and the outgoing packet controller 3208 in the logic device 3210 perform processing differently from the incoming packet controller 203 and the outgoing packet controller 208 in the logic device 210.

The setting register 3212 in the logic device 3210 has a storage area for transitorily storing data and is connected with all the processing modules in the logic device 3210 like the setting register 212 in Embodiment 1. However, the setting register 3212 stores data different from the data stored by the setting register 212 because of the processing of the incoming packet controller 3203. The following description omits explanation of the processing of the setting register 3212.

The incoming header processing module 202 and the outgoing header processing module 207 in Embodiment 3 are the same as the incoming header processing module 202 and the outgoing header processing module 207 in Embodiment 1.

The statistical information table 3213 corresponds to the computation table 214 in Embodiment 1 and stores results of table updating performed in the incoming packet controller 3203. Embodiment 3 is an embodiment in the case where the communication apparatus in this embodiment does not use the setting table 213 in Embodiment 1.

When the incoming packet controller 3203 receives an incoming packet from the incoming header processing module 202, it processes the packet using the statistical information table 3213, namely, performs statistical counting. The incoming packet controller 3203 does not store the packet in the incoming packet buffer but sends the packet to the SW interface 205 simultaneously with the statistical counting.

Figure 22:
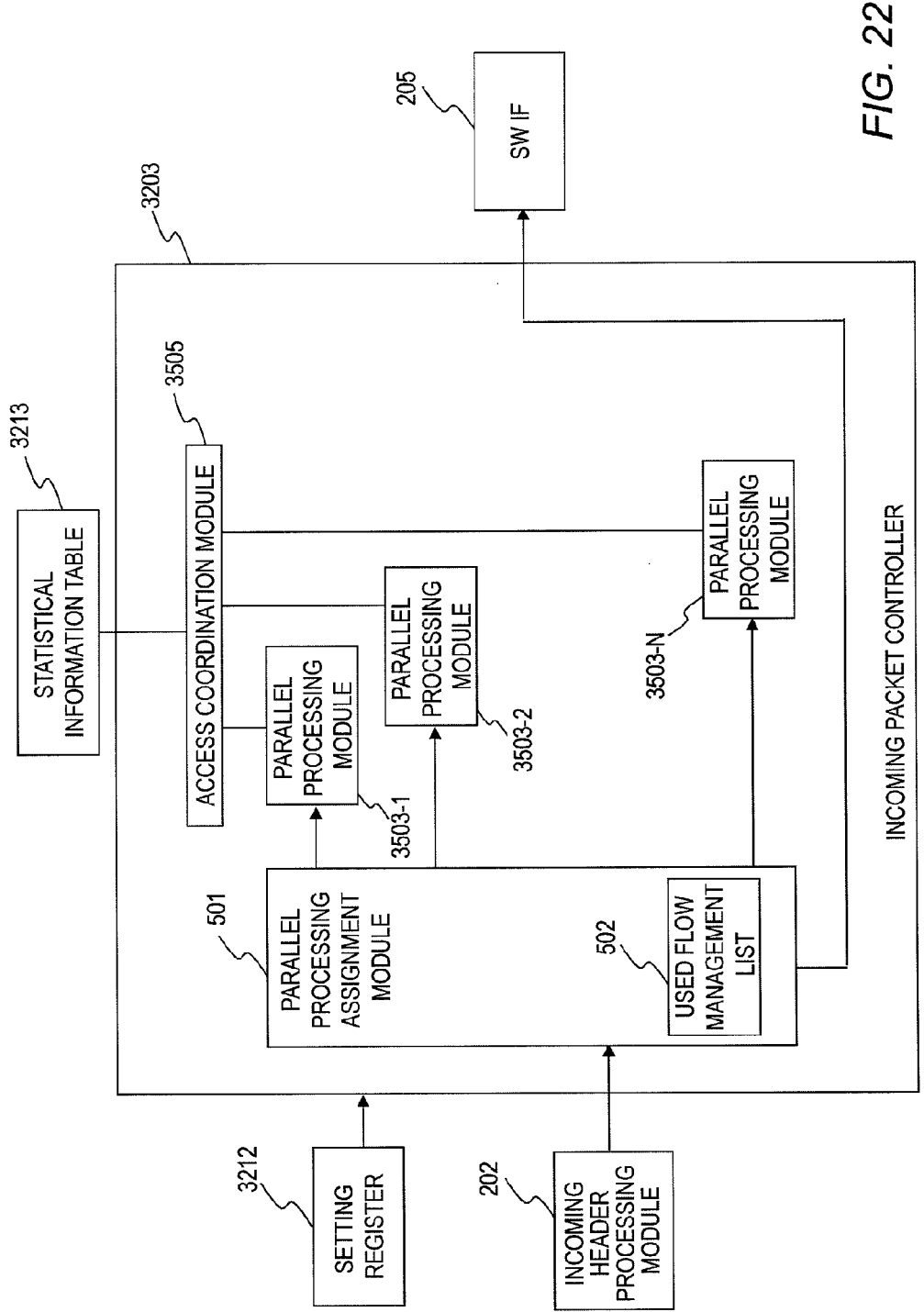
FIG. 22 is a block diagram illustrating a logical configuration of an incoming packet controller in Embodiment 3.

FIG. 22 is a block diagram illustrating a logical configuration of the incoming packet controller 3203 in Embodiment 3.

The incoming packet controller 3203 has the same configuration as that of the incoming packet controller 203 shown in FIG. 5. The difference between the incoming packet controller 3203 and the incoming packet controller 203 in Embodiment 1 is that the incoming packet controller 3203 includes a plurality of parallel processing modules 3503 (3503-1 to 3503-N) and an access coordination module 3505 and does not include an output determination module and an incoming packet buffer. The parallel processing modules 3503 and the access coordination module 3505 perform processing differently from the parallel processing modules 503 and the access coordination module 505.

The used flow management list 502 in Embodiment 3 is also different from the used flow management list 502 in Embodiment 1 in the point that the parallel processing modules 601 in the used flow management list 502 represent the parallel processing modules 3503-1 to 3503-N.

The parallel processing assignment module 501 in Embodiment 3 performs the same processing assignment S950 as the processing of the parallel processing assignment module 501 in Embodiment 1. However, when the parallel processing assignment module 501 in Embodiment 3 receives an incoming packet, it starts processing assignment S950 and also sends the received incoming packet to the SW interface 205.

Each parallel processing module 3503 performs later-described table updating S2450 and updates information on a flow included in the statistical information table 3213.

Like in Embodiment 1, the time required for table updating S2450 by the parallel processing module 3503 is predetermined in Embodiment 3. Still like in Embodiment 1, the number N of the parallel processing modules 3503 is predetermined based on the table update time length and the shortest packet arrival interval.

The access coordination module 3505 coordinates the accesses (retrievals and write-backs) from the parallel processing modules 3503 to the statistical information table 3213, like the access coordination module 505 in Embodiment 1.

FIG. 23 is an explanatory diagram illustrating the statistical information table 3213 in Embodiment 3.

The statistical information table 3213 is a table including information on the packets received by the packet communication apparatus 32. The statistical information table 3213 includes columns of flow IDs 3701, the numbers of received packets 3702, and the numbers of received bytes 3703.

Each flow ID 3701 includes a flow ID of incoming packets. Each number of received packets 3702 includes the number of incoming packets received by the parallel processing assignment module 501. Each number of received bytes 3703 indicates the total number of bytes of the incoming packets received by the parallel processing assignment module 501.

Hereinafter, described is table updating S2450 performed by one of the parallel processing modules 3503-1 to 3503-N.

Figure 24:
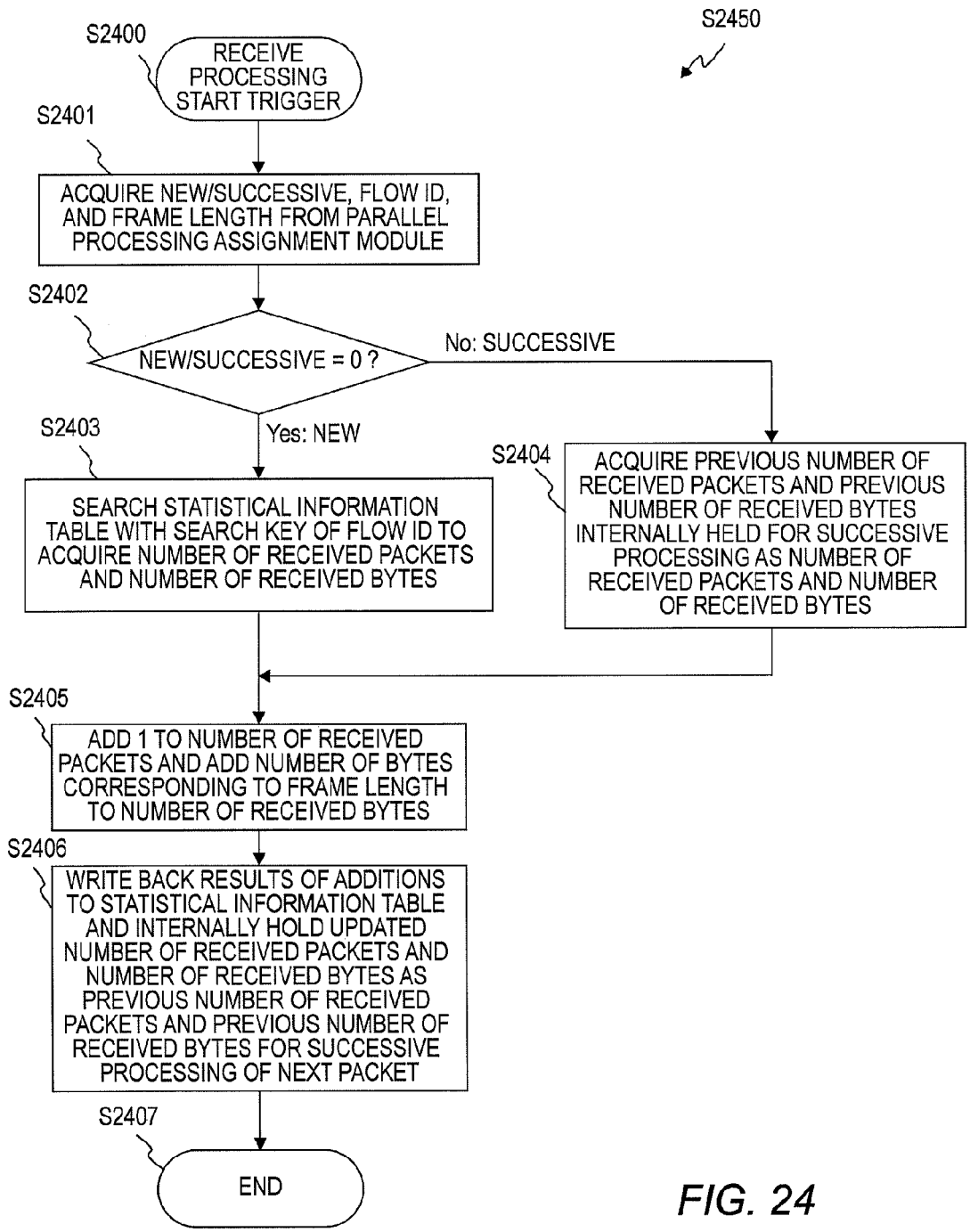
FIG. 24 is a flowchart illustrating table updating performed by a parallel processing module in Embodiment 3.

FIG. 24 is a flowchart illustrating the table updating S2450 performed by the parallel processing module 3503 in Embodiment 3.

Upon receipt of a notice of assignment including a processing start trigger from the parallel processing assignment module 501 (S2400), the parallel processing module 3503 acquires the new/successive parameter, the flow ID, and the frame length included in the notice of assignment (S2401).

After S2401, the parallel processing module 3503 determines whether the new/successive parameter is "0", namely, whether the new/successive parameter indicates "new" (S2402).

If the new/successive parameter is "0", meaning if it is determined that the new/successive parameter indicates "new" at S2402, the parallel processing module 3503 searches the statistical information table 3213 with a search key of the flow ID acquired at S2401, namely, the flow ID of the incoming packet. As a result of the search, the parallel processing module 3503 acquires the number of received packets 3702 and the number of received bytes 3703 (S2403). After S2403, the parallel processing module 3503 proceeds to S2405.

If, at S2402, the new/successive parameter is not "0", meaning if it is determined that the new/successive parameter indicates "successive", the parallel processing module 3503 acquires the previous number of received packets and the previous number of received bytes internally held for successive processing by the parallel processing module 3503 (S2404). After S2404, the parallel processing module 3503 proceeds to S2405.

After S2403 or S2404, the parallel processing module 3503 adds "1" to the number of received packets (the number of received packets 3702 acquired at S2403 or the previous number of received packets acquired at S2404). Then, the parallel processing module 3503 acquires the result of the addition as the updated number of received packets.

Furthermore, the parallel processing module 3503 adds the number of bytes corresponding to the frame length acquired at S2401 to the number of received bytes (the number of received bytes 3703 acquired at S2403 or the previous number of received bytes acquired at S2404). Then, the parallel processing module 3503 acquires the result of the addition as the updated number of received bytes (S2405).

After S2405, the parallel processing module 3503 writes back the updated number of received packets to the number of received packets 3702 in the statistical information table 3213 and writes back the updated number of received bytes to the number of received bytes 3703 in the statistical information table 3213.

The parallel processing module 3503 internally holds the updated number of received packets and the updated number of received bytes acquired at S2405 as a previous number of received packets and a previous number of received bytes for successive processing of the next incoming packet (S2406). After S2406, the parallel processing module 3503 terminates the table updating S2450 (S2407).

Figure 25:
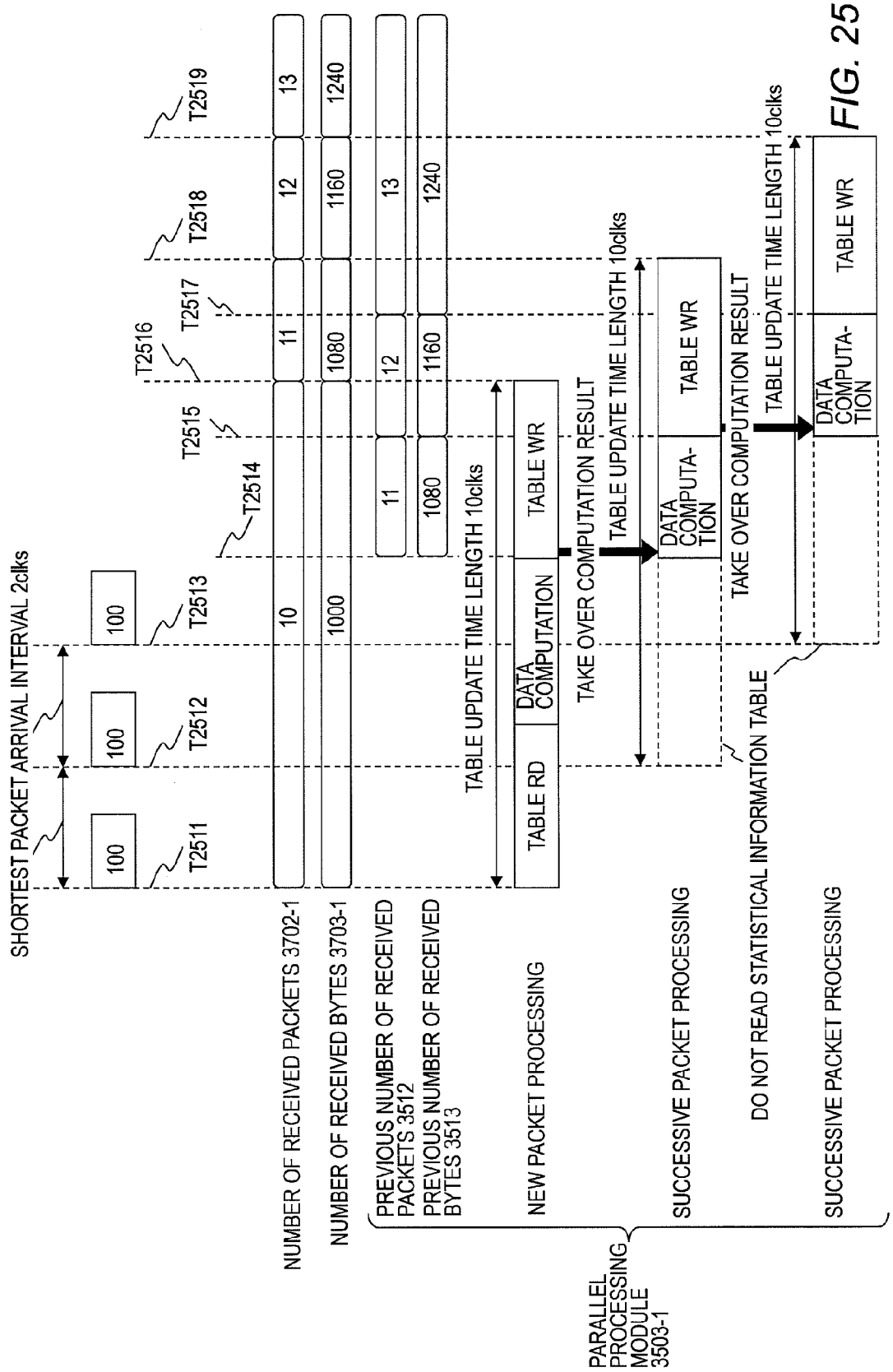
FIG. 25 is an explanatory diagram illustrating transitions of the number of received packets and the number of received bytes caused by the table updating performed by the parallel processing module in Embodiment 3.

FIG. 25 is an explanatory diagram illustrating transitions of the number of received packets and the number of received bytes caused by the table updating performed by the parallel processing module 3503 in Embodiment 3.

Assuming that the table update time length is 10 clks and the shortest packet arrival interval is 2 clks, FIG. 25 illustrates an example that the parallel processing module 3503-1 successively receives incoming packets of the same flow ID "100" at 2-clk intervals. In FIG. 25, the frame lengths of the incoming packets are 80.

The first packet is an incoming packet on which the parallel processing assignment module 501 has determined at S904 that the parallel processing module 3503-1 is to newly perform table updating.

When the parallel processing module 3503-1 in Embodiment 3 receives a notice of assignment including a new/successive parameter indicating "new", the flow ID of the first packet, the frame length of the first packet, and a processing start trigger from the parallel processing assignment module 501 (T2511), the parallel processing module 3503-1 starts searching the statistical information table 3213 with a search key of the flow ID of the first packet. As a result of the search, the parallel processing module 3503-1 acquires the number of received packets 3702 and the number of received bytes 3703 associated with the flow ID of the first packet (table RD).

The table RD for the first packet corresponds to S2400 to S2403 in FIG. 24. The values acquired in the table RD for the first packet shown in FIG. 25 are "10" for the number of received packets 3702-1 and "1000" for the number of received bytes 3703-1.

The parallel processing module 3503-1 adds "1" to the acquired value "10" for the number of received packets and adds "80" of the frame length of the first packet to the retrieved value "1000" for the number of received bytes. Then, the parallel processing module 3503-1 acquires results of the additions "11" and "1080" for the updated number of received packets and the updated number of received bytes (data computation).

When the data computation is completed (T2514), the parallel processing module 3503-1 starts writing back "11" of the updated number of received packets and "1080" of the updated number of received bytes to the statistical information table 3213 (table WR). The table WR for the first packet corresponds to S2405.

Since accessing a table requires some time, the value "11" of the updated number of received packets and the value "1080" of the updated number of received bytes are reflected to the statistical information table 3213 at T2516.

Meanwhile, the parallel processing module 3503-1 internally holds the value "11" of the updated number of received packets and the value "1080" of the updated number of received bytes as a previous number of received packets 3512 and a previous number of received bytes 3513 for successive processing of the next incoming packet. The processing of internally holding the updated number of received packets "11" and the updated number of received bytes "1080" corresponds to S2406.

The second packet is received by the parallel processing assignment module 501 before completion of the table updating for the first packet. The parallel processing assignment module 501 determines that the parallel processing module 3503-1 is to successively perform table updating for the second packet.

When the parallel processing module 3503-1 receives a notice of assignment including a new/successive parameter indicating "successive", the flow ID of the second packet, the flow length of the second packet, and a processing start trigger from the parallel processing assignment module 501 (T2512), the table WR in the table updating for the first packet has not been completed. Accordingly, the parallel processing module 3503-1 does not access the statistical information table 3213.

For this reason, table RD or dummy RD is not performed in the table updating for the second packet in Embodiment 3.

After T2514, the parallel processing module 3503-1 takes over the value "11" of the previous number of received packets 3512 and the value "1080" of the previous number of received bytes 3513 internally held in the table updating for the first packet to start data computation for the second packet. The processing until T2514 corresponds to S2400 to S2402 and S2404 shown in FIG. 24.

It should be noted that the parallel processing module 3503-1 performs data computation after the takeover of the previous number of received packets 3512 and the previous number of received bytes 3513 within 2 clks since the packet arrival interval is 2 clks. If the parallel processing module 3503-1 needs a time longer than the packet arrival interval to complete the data computation, the parallel processing assignment module 501 may discard an incoming packet.

In the data computation for the second packet, the parallel processing module 3503-1 adds "1" to the value "11" of the taken over previous number of received packets 3512 and adds "80" of the frame length to the value "1080" of the taken over previous number of received bytes 3513. The parallel processing module 3503-1 obtains the result of the addition "12" as the updated number of received packets and the result of the addition "1160" as the updated number of received bytes.

When the data computation is completed at T2515, the parallel processing module 3503-1 starts writing back the updated number of received packets "12" and the updated number of received bytes "1160" to the statistical information table 3213 (table WR). The table WR starting at T2515 corresponds to S2405 in FIG. 24.

Since accessing the table requires some time, the value "12" of the updated number of received packets and the value "1160" of the updated number of received bytes are reflected to the statistical information table 3213 at T2518.

Meanwhile, in the table WR starting at T2515, the parallel processing module 3503-1 internally holds the updated number of received packets "12" and the updated number of received bytes "1160" as a previous number of received packets 3512 and a previous number of received bytes 3513 for successive processing of the next incoming packet. This processing of internally holding the updated number of received packets "12" and the updated number of received bytes "1160" corresponds to S2406 in FIG. 24.

Like the second packet in Embodiment 1 or Embodiment 2, the third packet in Embodiment 3 is received by the parallel processing assignment module 501 before completion of the table updating for the second packet; accordingly, the table updating for the third packet is the same as the table updating for the second packet.

In the table WR starting at T2517, the parallel processing module 3503-1 holds "13" for the previous number of received packets 3512 and "1240" for the previous number of received bytes 3513. After T2519 when the table updating for the third packet ends, the number of received packets 3702-1 stores "13" and the number of received bytes 3703-1 stores "1240".

According to Embodiment 3 described above, like the effect of the Embodiment 1, the packet communication apparatus 32 holds a previous computation result in each parallel processing module 3503 and uses the computation result to perform data computation for successively received incoming packets. Hence, the parallel processing module 3503 in Embodiment 3 does not need to access the statistical information table 3213 at every table updating and can successively perform table updating for the packet management function.

Furthermore, the less access to the statistical information table 3213 can save the power consumption of the packet communication apparatus.

It should be noted that the parallel processing module in the foregoing embodiments may perform processing differently depending on the value of the new/successive parameter. Specifically, in S1102 to S1106 shown in FIG. 11, S1802 to S1812 shown in FIG. 18A, and S2402 to S2404 shown in FIG. 24, the parallel processing module may perform processing differently as predetermined by the user depending on whether the new/successive parameter indicates "new" or "successive".

Through this approach, the parallel processing module in the embodiments can obtain different values for computation results to be updated as requested by the user in the cases where incoming packets are received successively and incoming packets are not received successively.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A communication apparatus connected with a network, the communication apparatus comprising:

an input interface for receiving packets sent from the network;

a plurality of parallel processing modules for executing processing for the packets;

a parallel processing assignment module for assigning the processing for the packets to the parallel processing modules on a packet-by-packet basis; and a computation table including values indicating results of execution of the processing for the packets and flow IDs assigned to the packets, wherein the plurality of parallel processing modules access the computation table after executing processing for the packets, wherein each of the parallel processing modules holds a result of execution of processing for a packet performed by the parallel processing module for a successive processing, wherein the parallel processing assignment module holds a used flow management list including the flow IDs assigned to the packets for which the parallel processing modules execute processing and values indicating statuses of the processing for the packets in the parallel processing modules, wherein, upon receipt of a first packet, the parallel processing assignment module determines whether processing for a second packet assigned the flow ID associated with the first packet is being executed based on the used flow management list and a flow ID assigned to the first packet, wherein, in a case where a result of the determination indicates that the processing for the second packet is being executed, the parallel processing assignment module determines that the parallel processing module executing the processing for the second packet is a parallel processing module to execute the processing for the first packet and further determines a parameter to be included in a notice of assignment to be sent to the determined parallel processing module in accordance with the result of the determination, wherein the parallel processing assignment module includes information about the first packet in the notice of assignment to send the notice of assignment to the determined parallel processing module, wherein the determined parallel processing module acquires, upon receipt of the notice of assignment, a result of execution of the processing for the second packet from the result of execution of the processing held in the parallel processing module in accordance with the received notice of assignment, wherein the determined parallel processing module executes the processing for the first packet using the acquired result of execution of the processing for the second packet and the information included in the notice of assignment, and wherein the determined parallel processing module updates the computation table with a result of execution of the processing for the first packet.

2. The communication apparatus according to claim 1, wherein each of the values indicating statuses of the processing included in the used flow management list is a value indicating a time of execution that has passed since the parallel processing module started the processing for a packet, wherein the parallel processing assignment module acquires, upon receipt of the first packet, a flow ID assigned to the first packet and a value indicating the time of execution that has passed since a parallel processing module for executing the processing for the second packet started the processing for the second packet from the used flow management list, wherein the parallel processing assignment module determines whether the processing for the second packet is being executed based on the acquired value indicating the time of execution, wherein, in a case where a result of the determination indicates that the processing for the second packet is being executed, the parallel processing assignment module determines that the parallel processing module executing the processing for the second packet is to execute the processing for the first packet and further determines the parameter to be a value indicating successive processing, and wherein, in a case where the received notice of assignment includes the parameter indicating successive processing, the determined parallel processing module acquires the result of execution of the processing for the second packet from the result of execution of the processing for a packet held in the parallel processing module.

3. The communication apparatus according to claim 1, further comprising a setting table including predetermined setting values to be used in the processing for the packets and flow IDs assigned to the packets, wherein the information about the first packet included in the notice of assignment includes the flow ID assigned to the first packet, wherein the determined parallel processing module retrieves, upon receipt of the notice of assignment, a predetermined setting value to be used in the processing for the first packet from the setting table in accordance with the received notice of assignment, and wherein the determined parallel processing module executes the processing for the first packet using the acquired result of execution of the processing for second packet, the acquired information about the first packet included in the notice of assignment, and the retrieved predetermined setting value.

4. The communication apparatus according to claim 3, wherein each of the predetermined setting values included in the setting table includes an amount of token to be added per unit time to a token bucket associated with a flow ID and a maximum amount of token to be accumulated in the token bucket, wherein each of the results of execution of the processing for the packets includes an amount of token accumulated in the token bucket and a latest time when the amount of token accumulated in the token bucket was calculated, wherein the information about the first packet included in the notice of assignment includes a frame length of the first packet, wherein, in a case where the determined parallel processing module determines, through the execution of the processing for the first packet, that an amount of token accumulated in the token bucket before receipt of the first packet is less than the amount of token corresponding to the frame length of the first packet, the determined parallel processing module outputs information indicating that transmission of the first packet is out of guarantee, and wherein, in a case where the determined parallel processing module determines, through the execution of the processing for the first packet, that an amount of token accumulated in the token bucket before receipt of the first packet is equal to or more than the amount of token corresponding to the frame length of the first packet, the determined parallel processing module outputs information indicating that transmission of the first packet is under guarantee.

5. The communication apparatus according to claim 3, further comprising:

a packet buffer for holding the packets received via the input interface; and an output determination module for rewriting headers of the packets, wherein, upon receipt of the first packet, the parallel processing assignment module stores the first packet in the packet buffer, wherein the determined parallel processing module sends the output determination module an instruction to rewrite a header of the first packet in accordance with the result of execution of the processing for the first packet, wherein the output determination module acquires the first packet from the packet buffer in accordance with the instruction to rewrite the header of the first packet, and wherein the output determination module rewrites the header of the acquired first packet.

6. The communication apparatus according to claim 1, wherein the information about the first packet included in the notice of assignment includes a frame length of the first packet, wherein each of the results of execution of the processing for the packets includes the number of packets received by the communication apparatus and the number of bytes of the packets received by the communication apparatus, and wherein the determined parallel processing module executes the processing for the first packet by referring to the acquired result of execution of the processing for the second packet and the information included in the notice of assignment, adding 1 to the number of packets indicated by the result of execution of the processing for the second packet, and adding a frame length of the first packet to the number of bytes indicated by the result of execution of the processing for the second packet.

7. The communication apparatus according to claim 1,
wherein each of the parallel processing modules holds processing methods depending on values indicated by the parameter, and
wherein the determined parallel processing module executes the processing for the first packet by one of the methods in accordance with the value indicated by the parameter using the acquired result of execution of the processing for the second packet and the acquired information included in the notice of assignment.

8. A communication method performed by a communication apparatus connected with a network,
the communication apparatus including:
an input interface for receiving packets sent from the network;
a plurality of parallel processing modules for executing processing for the packets;
a parallel processing assignment module for assigning the processing for the packets to the parallel processing modules on a packet-by-packet basis; and
a computation table including values indicating results of execution of the processing for the packets and flow IDs assigned to the packets,
the plurality of parallel processing modules access the computation table after executing processing for the packets,
each of the parallel processing modules holding a result of execution of the processing for a packet performed by the parallel processing module for a successive processing,
the parallel processing assignment module holding a used flow management list including the flow IDs assigned to the packets for which the parallel processing modules execute the processing and values indicating statuses of the processing for the packets in the parallel processing modules, and
the communication method comprising:
determining, by the parallel processing assignment module that has received a first packet, whether processing for a second packet assigned the flow ID associated with the first packet is being executed based on the used flow management list and a flow ID assigned to the first packet;
in a case where a result of the determination indicates that the processing for the second packet is being executed, determining, by the parallel processing assignment module, that the parallel processing module executing the processing for the second packet is a parallel processing module to execute the processing for the first packet and further determines a parameter to be included in a notice of assignment to be sent to the determined parallel processing module in accordance with the result of the determination;
including, by the parallel processing assignment module, information about the first packet in the notice of assignment to send the notice of assignment to the determined parallel processing module;
acquiring, by the determined parallel processing module that has received the notice of assignment, a result of execution of the processing for the second packet from the result of execution of the processing held in the parallel processing module in accordance with the received notice of assignment,
executing, by the determined parallel processing module, the processing for the first packet using the acquired result of execution of the processing for the second packet and the information included in the notice of assignment; and
updating, by the determined parallel processing module, the computation table with the result of execution of the processing for the first packet.

9. The communication method according to claim 8,
wherein each of the values indicating statuses of the processing included in the used flow management list is a value indicating a time of execution that has passed since the parallel processing module started the processing for a packet,
wherein the communication method further comprises:
acquiring, by the parallel processing assignment module that has received the first packet, a flow ID assigned to the first packet and a value indicating the time of execution that has passed since a parallel processing module for executing the processing for the second packet started the processing for the second packet from the used flow management list;
determining, by the parallel processing assignment module, whether the processing for the second packet is being executed based on the acquired value indicating the time of execution;
determining, by the parallel processing assignment module, that the parallel processing module executing the processing for the second packet is to execute the processing for the first packet and further determining the parameter to be a value indicating successive processing, in a case where a result of the determination indicates that the processing for the second packet is being executed; and
acquiring, by the determined parallel processing module, a result of execution of the processing for the second packet from the result of execution of the processing for a packet held in the parallel processing module, in a case where the received notice of assignment includes the parameter indicating successive processing.

10. The communication method according to claim 8,
wherein the communication apparatus further includes a setting table including predetermined setting values to be used in the processing for the packets and flow IDs assigned to the packets,
wherein the information about the first packet included in the notice of assignment includes a flow ID assigned to the first packet, and
wherein the communication method further comprises:
retrieving, by the determined parallel processing module that has received the notice of assignment, a predetermined setting value to be used in the processing for the first packet from the setting table in accordance with the received notice of assignment; and
executing, by the determined parallel processing module, the processing for the first packet using the acquired result of execution of the processing for the second packet, the acquired information about the first packet included in the notice of assignment, and the retrieved predetermined setting value.

11. The communication method according to claim 10,
wherein each of the predetermined setting values included in the setting table includes an amount of token to be added per unit time to a token bucket associated with a flow ID and a maximum amount of token to be accumulated in the token bucket,
wherein each of the results of execution of the processing for the packets includes an amount of token accumulated in the token bucket and a latest time when the amount of token accumulated in the token bucket was calculated, wherein the information about the first packet included in the notice of assignment includes a frame length of the first packet, and wherein the communication method further comprises:

outputting, by the determined parallel processing module, information indicating that transmission of the first packet is out of guarantee, in a case where the determined parallel processing module determines, through the execution of the processing for the first packet, that an amount of token accumulated in the token bucket before receipt of the first packet is less than the amount of token corresponding to the frame length of the first packet; and outputting, by the determined parallel processing module, information indicating that transmission of the first packet is under guarantee, in a case where the determined parallel processing module determines, through the execution of the processing for the first packet, that an amount of token accumulated in the token bucket before receipt of the first packet is equal to or more than the amount of token corresponding to the frame length of the first packet.

12. The communication method according to claim 10, wherein the communication apparatus further includes:
- a packet buffer for holding the packets received via the input interface; and
- an output determination module for rewriting headers of the packets, and wherein the communication method further comprises:

storing, by the parallel processing assignment module that has received the first packet, the first packet in the packet buffer;

sending, by the determined parallel processing module, the output determination module an instruction to rewrite a header of the first packet in accordance with the result of execution of the processing for the first packet;

acquiring, by the output determination module, the first packet from the packet buffer in accordance with the instruction to rewrite the header of the first packet; and rewriting, by the output determination module, the header of the acquired first packet.

13. The communication method according to claim 8, wherein the information about the first packet included in the notice of assignment includes a frame length of the first packet, wherein each of the results of execution of the processing for the packets includes the number of packets received by the communication apparatus and the number of bytes of the packets received by the communication apparatus, and wherein the communication method further comprises:

executing, by the determined parallel processing module, the processing for the first packet by referring to the acquired result of execution of the processing for the second packet and the information included in the notice of assignment, adding 1 to the number of packets indicated by the result of execution for the second packet, and adding a frame length of the first packet to the number of bytes indicated by the result of execution of the processing for the second packet.

14. The communication method according to claim 8, wherein each of the parallel processing modules holds processing methods depending on values indicated by the parameter, and wherein the communication method further comprises:

executing, by the determined parallel processing module, the processing for the first packet by one of the methods in accordance with the value indicated by the parameter using the acquired result of execution of the processing for the second packet and the acquired information included in the notice of assignment.

* * * * *